US012394193B2

(12) United States Patent
Southin et al.

(10) Patent No.: US 12,394,193 B2
(45) Date of Patent: Aug. 19, 2025

(54) SCALABLE VECTOR CAGES: VECTOR-TO-PIXEL METADATA TRANSFER FOR OBJECT PART CLASSIFICATION

(71) Applicant: DISCOVERY LOFT INC., Toronto (CA)

(72) Inventors: Stephen Robert Southin, Toronto (CA); Þorsteinn Hjörtur Jónsson, Toronto (CA); Travis Squires, Toronto (CA); Angus Galloway, Toronto (CA); Robert Mackenzie Beggs, Toronto (CA); Griffin Floto, Toronto (CA); Ermal Rrapaj, Toronto (CA); Paul Lupinacci, Toronto (CA)

(73) Assignee: DISCOVERY LOFT INC., Toronto (CA)

( * ) Notice: Subject to any disclaimer, the term of this patent is extended or adjusted under 35 U.S.C. 154(b) by 0 days.

(21) Appl. No.: 18/756,328

(22) Filed: Jun. 27, 2024

(65) Prior Publication Data

US 2024/0378878 A1    Nov. 14, 2024

Related U.S. Application Data

(63) Continuation of application No. 18/720,315, filed as application No. PCT/CA2024/050358 on Mar. 22, 2024.

(Continued)

(51) Int. Cl.
*G06V 10/86* (2022.01)
*G06T 7/00* (2017.01)
(Continued)

(52) U.S. Cl.
CPC .......... *G06V 10/86* (2022.01); *G06T 7/0002* (2013.01); *G06V 10/26* (2022.01); *G06V 10/75* (2022.01);

(Continued)

(58) Field of Classification Search
CPC ........ G06V 10/86; G06V 10/26; G06V 10/75; G06V 10/746; G06V 20/60;

(Continued)

(56) References Cited

U.S. PATENT DOCUMENTS 9,639,957 B2    5/2017    Yalniz et al.
10,740,891 B1    8/2020    Chen et al.
(Continued)

FOREIGN PATENT DOCUMENTS

WO    WO 2020077449 A1 *    4/2020

OTHER PUBLICATIONS

Liming Shen et al., "Domain-Specific Language Techniques for Visual Computing: A Comprehensive Study" Archives of Computational Methods in Engineering (2021) 28:3113-3134, Published online: Oct. 27, 2020 @ CIMNE, Barcelona, Spain 2020.*

(Continued)

*Primary Examiner* — Samir A Ahmed
(74) *Attorney, Agent, or Firm* — Norton Rose Fulbright Canada LLP

(57) ABSTRACT

Improved and alternative processes for object segmentation segment from captured images are presented. According to an aspect there is provided, systems and methods for classifying segments of an object. The systems and methods include processing captured images using a plurality of cages to identify a cage for image alignment, the cage defining segments of the object, aligning the captured images onto the cage to identify segments of the object in the captured images, and detecting one or more defects in the segments of the object in the captured images.

19 Claims, 13 Drawing Sheets

Related U.S. Application Data

(60) Provisional application No. 63/453,882, filed on Mar. 22, 2023.

(51) Int. Cl.
| | |
|---|---|
| *G06V 10/26* | (2022.01) |
| *G06V 10/75* | (2022.01) |
| *G06V 10/764* | (2022.01) |
| *G06V 20/60* | (2022.01) |

(52) U.S. Cl.
CPC ............ *G06V 10/764* (2022.01); *G06V 20/60* (2022.01); *G06T 2207/20081* (2013.01); *G06V 2201/08* (2022.01); *G06V 2201/10* (2022.01)

(58) Field of Classification Search
CPC ........... G06V 2201/08; G06V 2201/10; G06V 10/10; G06V 10/24; G06T 7/0002; G06T 2207/20081; G06Q 30/0633; G06Q 50/40; G06Q 10/0875; G06Q 10/20; G06Q 30/0278; G06Q 30/0603; G06Q 30/0641; G06N 20/00

See application file for complete search history.

(56) References Cited

U.S. PATENT DOCUMENTS

| | | | |
|---|---|---|---|
| 2017/0039723 A1* | 2/2017 | Price | G06T 7/174 |
| 2019/0096135 A1 | 3/2019 | Dal Mutto et al. | |
| 2019/0147583 A1 | 5/2019 | Stefan | |
| 2022/0207861 A1* | 6/2022 | Li | G06V 20/70 |
| 2023/0153975 A1 | 5/2023 | Lutich et al. | |
| 2023/0162243 A1 | 5/2023 | Southin | |

OTHER PUBLICATIONS

Arróspide et al., Vehicle detection and tracking using homography-based plane rectification and particle filtering, 2010 IEEE Intelligent Vehicles Symposium.

* cited by examiner

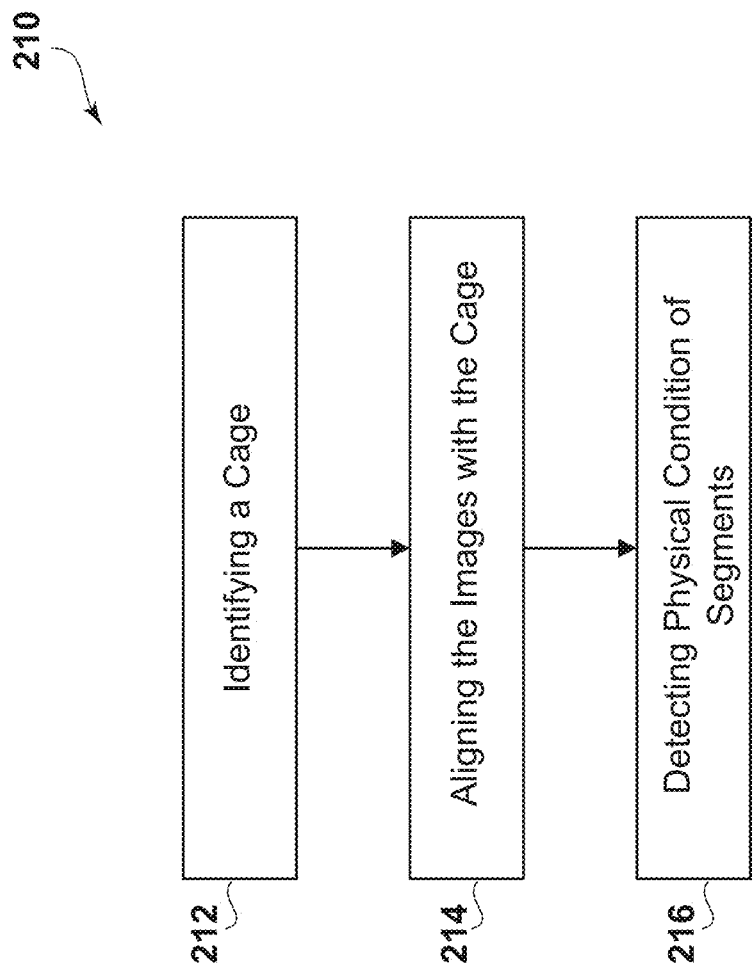

← CAGE MANAGER
2016 Audi S3 - Sedan

Information

Actions
[Request-Review] [Active] [Confirm] [Archive] [Draft]    Status
[Process-Photo] [Delete]                                 Confirm Auto Values
[Type B] [Class: Compact Car]

| Make | Model | Year | Body Type | Trim & Configuration | Platform Code |
|---|---|---|---|---|---|
| Audi ▾ | S3-Sedan ▾ | 2016 ▾ | 4dr_Car ▾ | 2.0T Premium Plus 4dr. ▾ | (8V) |

Cage Detail

| Detail | Photo | Photo By | Cage(SVG) | Cage By | Outline (SVG) | Outline By | Label | Label By |
|---|---|---|---|---|---|---|---|---|
| 01 Left View | 🖼 | User | 🖼 | User | 🖼 | User | 🖼 | 🗑 | User ✕ |
| 02 Front View | 🖼 | User | 🖼 | User | 🖼 | User | 🖼 | 🗑 | User ✕ |
| 03 Right View | 🖼 | User | 🖼 | User | 🖼 | User | 🖼 | 🗑 | User ✕ |
| 04 Rear View | 🖼 | User | 🖼 | User | 🖼 | User | 🖼 | 🗑 | User ✕ |

FIG. 9

SCALABLE VECTOR CAGES: VECTOR-TO-PIXEL METADATA TRANSFER FOR OBJECT PART CLASSIFICATION

FIELD

The present disclosure generally relates to the field of computing platforms, artificial intelligence, computer vision, and image processing. In particular, this disclosure relates to systems and methods of processing images to segment an object into its constituent parts.

INTRODUCTION

Object part classification is traditionally carried out using image-based methods that rely on pixel-level segmentation techniques. These methods are often limited by the complexity of the object, as well as the quality of the image captured. Object complexity, image quality, object variability, and human bias are all factors that can affect the accuracy of part segmentation. Factors such as the number of parts being identified, their size and shape, substantially increase the complexity of performing object part classification.

There is a need for improvement in the processes used to segment objects from captured images, or at least alternatives, particularly to reduce bias in identifying small object parts.

SUMMARY

Embodiments of the invention described herein relate to object part classification utilizing Scalable Vector Cages (SVC) (also referred to as vector graphics or scalable vector graphics (SVG)). An example approach utilizes vector-based outlines to identify an object's components accurately, providing a one-shot learning method for mapping components based on their locations in the SVC to the pixels of a captured image. By labelling (manually or automatically) each component within the Scalable Vector Cages, the outlined information can be transferred to a machine model that can manipulate and overlay this information onto a captured image of the same object type. This can allow for the precise classification of all the components in the object which may further be usable for other applications. Furthermore, SVCs are designed to be in a format that is efficient to render as part of human interactive web interfaces.

Object part classification can be carried out using image-based methods that may rely solely on pixel-level segmentation or 3D mesh based techniques. However, these methods are computationally expensive and can be limited by the complexity of the object, as well as the quality of the image captured. In contrast, embodiments described herein provide an SVC approach that utilizes vector-based outlines that provide more accurate and precise identification of an object's components, which can provide efficient and accurate classification processes within human interactive interfaces. Embodiments described herein enable the SVC approach to perform efficiently with more complex objects and retain a scalability that is better than systems which utilize 3D models, such as 3D point clouds, 3D meshes or 3D Voxel Grids.

An advantage of the SVC approach is the combination of metadata in a vector format with a pixel format, which enables more accurate and efficient object recognition and classification. This approach can provide highly accurate traced outlines of an object and its defined parts, which can be easily transferred to a machine-learning model. Any such model can then be trained to recognize these outlines and classify objects more accurately, which can improve the overall efficiency and reliability of an inspection process.

Systems and methods described herein can be advantageous in object inspection, where other physical inspection methods can be time-consuming, costly, and potentially hazardous. Photo-based assessments can offer several advantages over conventional methods, such as time and cost savings, convenience, safety, improved accuracy, and data storage and sharing. However, determining part segmentation or identifying the boundaries between different parts or components of an object in a photo can be a significant challenge.

Object complexity, image quality, object variability, and human bias are all factors that can affect the accuracy of part segmentation. Machine learning approaches can be used to address these challenges, but they can be limited by training data availability, object variability, limited scope, ambiguity, and interpretability. Factors such as the number of different object parts, their sizes and shapes, can increase the complexity of the machine learning process so that it requires annotated data which can be expensive to collect.

Some embodiments of the systems and methods described herein aim to overcome these limitations by employing advanced machine learning techniques that can achieve accurate and reliable part segmentation to provide improvements to photo-based object inspection. These techniques apply to imagery data in a 2D pixel format or a 3D mesh format and their results can be enhanced from being run in conjunction with the SVC approach, which enables one-shot learning for object part classification.

Applications of the present systems and methods can include damage inspection for online/digital vehicle marketplaces, manufacturing, robotics, medical imaging, autonomous vehicles, augmented reality. Applications of the present systems and methods may include any object type made up of parts, including, but not limited to merchandise, industrial equipment, aircraft parts and components, construction equipment and machinery, medical equipment and devices, electronic devices and components, furniture and fixtures, agricultural machinery and equipment, marine vessels and components, manufacturing machinery and equipment, power generation and distribution equipment, scientific instruments, equipment, etc.

According to an aspect, there is provided a system for classifying segments of an object, the system including a server having non-transitory computer readable storage medium with executable instructions. The executable instructions for causing one or more processors to process captured images using a plurality of cages to identify a cage for image alignment, the cage defining segments of the object, align the captured images onto the cage to identify segments of the object in the captured images, and detect one or more physical conditions (e.g., defects) of the segments of the object in the captured images.

In some embodiments, the object includes a vehicle.

In some embodiments, the server is further configured to cause one or more processors to configure an interface application with an object capture module to capture the images of the object.

In some embodiments, the object capture module captures metadata for the captured images and the server is further configured to use the metadata to process the captured images.

In some embodiments, the cage is for an object type.

In some embodiments, the server retrieves the object type based on a serial or identification number of the object.

In some embodiments, the cage includes one or more different cage views.

In some embodiments, the cage can be rendered with segment outlines of varying widths.

In some embodiments, the cage includes a 3D model.

In some embodiments, the server can generate a virtual representation of the object using the captured images and the cage.

In some embodiments, the server can identify the object type based on the captured images.

In some embodiments, the server can compute cost data for repair of the one or more defects.

In some embodiments, the processor is configured to align the captured images onto the cage by generating a semantic mask from the captured images using semantic segmentation models and optimizing a homography matrix between the cage and the semantic mask. The homography matrix defines a composition of rotations, translations, scaling and/or distortion correction to align the cage with the semantic mask, wherein the cage and the semantic mask are compared as two binary arrays of a same shape.

In some embodiments, the system further comprises one or more machine learning models, wherein the machine learning models use the images and cages to identify and assess conditions of components of the object.

According to an aspect, there is provided a system for classifying segments of an object. The system including a server having non-transitory computer readable storage medium with executable instructions. The executable instructions for causing one or more processors to configure an image alignment process for captured images to align the captured images onto a cage, the cage defining segments of the object, and a recognition engine to process the captured images to classify one or more of the segments of the object.

According to an aspect, there is provided a system for training the systems described above. According to an aspect, there is provided a system for training at least one machine learning model of the system described herein, the machine learning model using the cages to identify and assess conditions of components of the object.

According to an aspect, there is provided a method for classifying segments of an object. The method including processing captured images using a plurality of cages to identify a cage for image alignment, the cage defining segments of the object, aligning the captured images onto the cage to identify segments of the object in the captured images, and detecting one or more physical conditions (e.g., defects) of the segments of the object in the captured images.

In some embodiments, the object includes a vehicle.

In some embodiments, the method includes capturing images of the object.

In some embodiments, the method includes capturing metadata for the captured images and using the metadata to at least one of align the captured images and detect the one or more defects.

In some embodiments, the cage is for an object type.

In some embodiments, the method includes retrieving the object type based on a serial or identification number of the object.

In some embodiments, the cage includes one or more different cage views.

In some embodiments, the cage can be rendered with segment outlines of varying widths.

In some embodiments, the cage includes a 3D model of the object type.

In some embodiments, the method includes generating a virtual representation of the object using the captured images and the cage.

In some embodiments, the method includes identifying the object type based on the captured images.

In some embodiments, the method includes computing cost data for repair of the one or more defects.

In some embodiments, the aligning the captured images onto the cage includes generating a semantic mask from the captured images using semantic segmentation models, and optimizing a homography matrix between the cage and the semantic mask, wherein the homography matrix defines a composition of rotations, translations, scaling and/or distortion correction to align the cage with the semantic mask, wherein the cage and the semantic mask are compared as two binary arrays of a same shape.

According to an aspect there is provided a system for classifying segments of an object. The system has: a server having non-transitory computer readable storage medium with executable instructions for causing one or more processors to: select a cage for image alignment, the cage defining segments of the object; align images of the object onto the cage to identify segments of the object in the images; detect one or more physical conditions of the segments of the object in the images.

In some embodiments, the object comprises a vehicle.

In some embodiments, the server is further configured to cause one or more processors to configure an interface application with an object capture module to capture the images of the object.

In some embodiments, the object capture module captures metadata for the captured images and the server is further configured to use the metadata to process the captured images.

In some embodiments, the cage is selected based on an object type.

In some embodiments, the cage is selected by processing the images using a plurality of cages.

In some embodiments, the server obtains the object type by extracting a serial or identification number of the object from an image.

In some embodiments, the cage comprises one or more different cage views.

In some embodiments, the cage can be rendered with segment outlines of varying widths.

In some embodiments, the cage comprises a graphic script in a domain specific language.

In some embodiments, the server is further configured to generate a virtual representation of the object using the images and the cage.

In some embodiments, the server is further configured to identify the object type based on the captured images.

In some embodiments, the server is further configured to compute cost data for repair of the one or more defects.

In some embodiments, the processor is configured to align the captured images onto the cage by: generating a semantic mask from the captured images using semantic segmentation models; and optimizing a homography matrix between the cage and the semantic mask, wherein the homography matrix defines a composition of rotations, translations, scaling, distortion correction and/or to align the cage with the semantic mask, wherein the cage and the semantic mask are compared as two binary arrays of a same shape.

According to an aspect, there is provided a method for classifying segments of an object. The method including aligning captured images onto a cage, the cage defining segments of the object and classifying one or more of the segments of the object from the captured images.

According to an aspect there is provided a non-transitory computer recordable storage medium having stored therein computer executable program code, which when executed by a processor, causes the processor to carry out methods described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 2A and FIG. 2B illustrate a process diagrams of methods of detecting defects in segments of an object, according to some embodiments.

FIG. 9 illustrates an example interface for a Scalable Vector Cage of a type, according to some embodiments.

DETAILED DESCRIPTION

Figure 1:
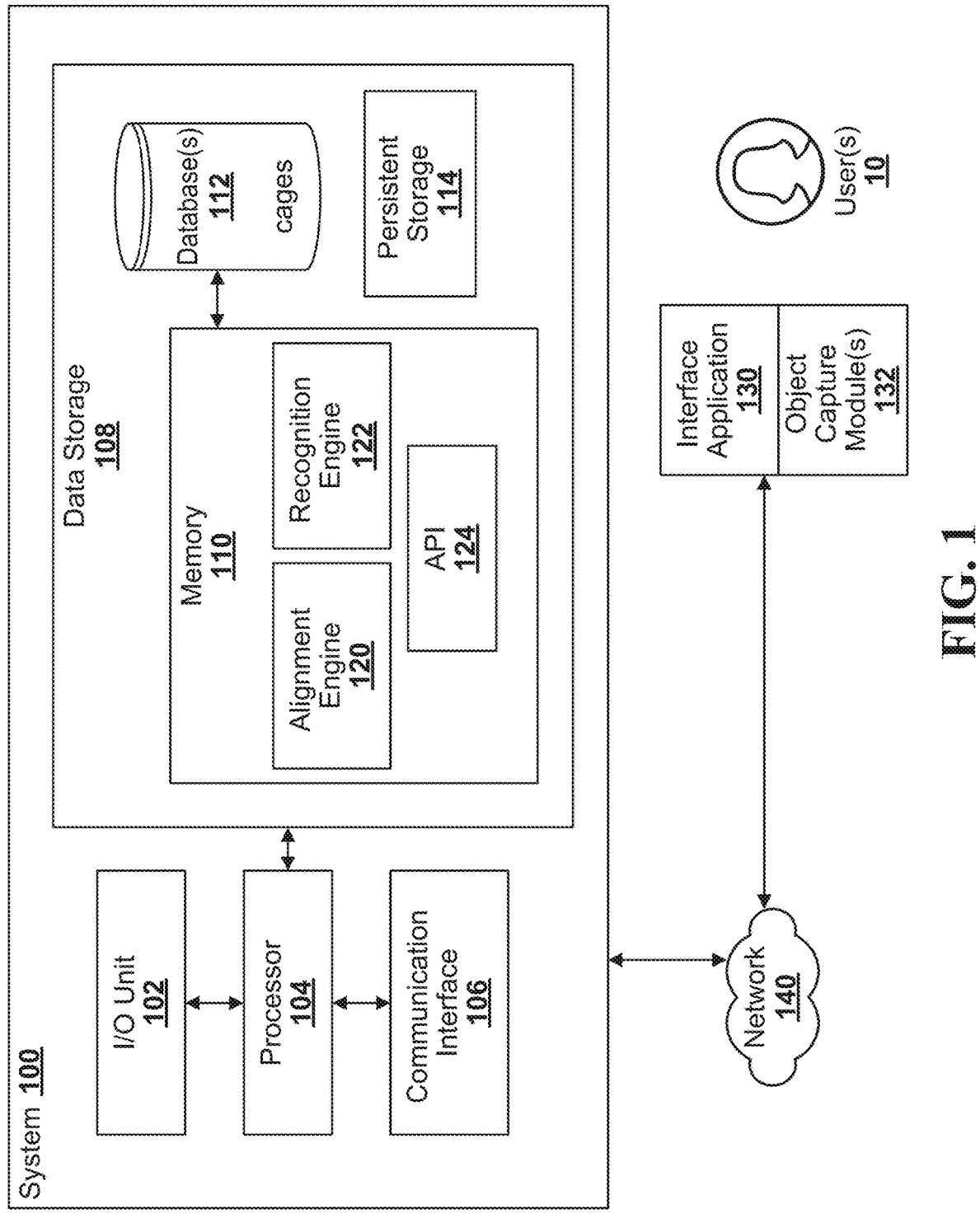
FIG. 1 illustrates a block schematic diagram of an example system for object segmentation and defect identification, according to some embodiments.

The Scalable Vector Cages approach can be a versatile technology with numerous potential applications. It can be used to recognize object parts accurately, making it particularly useful for situations where objects can be represented as a collection of distinct features. Once the parts of the object have been identified, then other processes (e.g., fault/damage detection/condition monitoring) may be carried out for use in a variety of applications.

The systems and methods described herein utilize, for example, Scalable Vector Cages. In some embodiments, this approach using Scalable Vector Cages may require only a single labelled example of the object type (e.g., the vehicle model) to segment the object. This approach may provide more efficient segmentation of an object (e.g., a vehicle) into its component parts. This approach may better be used to identify the constituent parts of an object which may be useful for further processes (e.g., to assess damage and defects).

In some embodiments, the systems and methods described herein are directed to an approach that may require only a single labeled example of the object type (e.g., the vehicle model) to segment the object. This labelled example can take the form of a cage for each object type, a Scalable Vector Cage specification which is an established standard in the industry of web-accessible graphics. The approach described herein can produce high-quality graphs of individual types and models of objects (such as vehicles). The cages can automatically coded with a labeling tool in the form of "Scalable Vector Cages" as opposed to pixel arrays.

These cages can be stored as fixed models of segments (parts). In some embodiments, estimates of repair of damage or impact on fair market value can be generated by determining which parts are damaged and how much it may cost to repair or replace. In some embodiments, the system may estimate this based on the replacement cost of the part. In some embodiments, the system may be configured to identify and factor in damage which may be repaired without replacing the part (e.g., minor dents in a vehicle).

Embodiments described herein can help, for example, the retail and wholesale industry for digital consumer and dealer-to-dealer transactions and reduce the need for the buyer to be physically present to make purchases or return a leased, shared and rented item. The systems and methods described herein can aide in image capture standardization, object (e.g., vehicle) segmentation, and object assessment.

Online marketplaces and digital transactions for vehicles (and other objects) are becoming increasingly popular. It is common for users to buy, lease, share, or rent vehicles based on the images provided on an online marketplace without physically inspecting them. However, it can be difficult for users to assess the quality of the vehicle based on images captured by different users in different lighting conditions, at different angles, and with varying cameras of quality.

Conventional methods for object (e.g., vehicle) assessment require physical presence by the party which may be cumbersome and inconvenient to plan if the parties do not reside nearby. Solutions to these conventional approaches include the completion of detailed forms by the customer, however these can be tedious to complete and it is possible that the customer may inaccurately complete the form (intentionally or otherwise). Other solutions include appraisal of the vehicle by a third party which may be expensive and inconvenient to plan.

A critical step in inspecting an object is first classifying parts, especially those that may be impacted by damage or are afflicted with other deviations. For example, when inspecting the exterior of a vehicle, it is important to identify which part of the vehicle is damaged, such as the front bumper, rear bumper, or side panel. This information can be essential because the repair cost and impact on the fair market value of the vehicle can vary depending on the impacted part. Therefore, accurately identifying the affected part can help ensure that the appropriate repair cost is assessed and the object's fair market value is appropriately estimated.

Guides for image capture can address some of the problems associated with image standardization. For example, the user capturing the images can be instructed to capture pictures of the two sides of a vehicle and the front and the back to provide standardized views. Another solution can be to overlay guides onto the image capture display to aid the user in properly aligning the images when capturing images of the vehicle (or other items). These guides can be generalized (e.g., general vehicle overlays) or bespoke (e.g., vehicle overlays stylized to look like the make and model of the vehicle). However, this may still lead to slight angle differences between the images or differences in quality of the image that make part segmentation difficult by other means.

Embodiments described herein can provide systems and methods for classifying segments of an object by processing images (e.g. images of the object or portions thereof) using one or more cages for image alignment. A cage can be a file that defines segments for an object. A cage can be a graphics script that is written in a domain specific language. This domain specific language can be a specialized computer language designed for the particular application domain and tailored to the specific context (e.g. vehicle condition). The domain specific language can be a key to databases. The script can define individual object components and label the components according to their condition. The script can define individual parts of an object (e.g., a vehicle) and label the parts by their current or estimated condition.

The cage or script can be used to render in two dimensions or three dimensions, for example. The cage can define a two dimension or three dimension model of the object and the segments of the object. Segments of an object can be parts of an object. An object can be partitioned into multiple segments. A cage can categorize different areas within an image (e.g. an image of the object) and map the areas to segments of the object. There can be different cage views that correspond to different perspectives or fields of view of the object. A cage can be used to located segments of the object in an image.

An example cage is a Scalable Vector Cage. A Scalable Vector Cage can be a file in vector image format. A Scalable Vector Cage can be a graphic script in a in a domain specific language. A Scalable Vector Cage can be a file that uses formulas to define shapes, borders, colors, and so on. (e.g., a vehicle).

Systems and methods described herein can use cages (e.g. Scalable Vector Cages) to align images taken of an object onto a generalized representation of that object type (i.e., a cage). This can then be used to segment the image based on the pre-segmented components of the Scalable Vector Cages. The Scalable Vector Cages can also contain language specific information relating to individual object parts and their current condition (e.g., a hierarchical naming scheme for that segment, type of the object, name of the object, hash that relates the object to the image and the capture session).

In some embodiments, Scalable Vector Cages can be, for example, 2D graphic scripts. The systems and methods described herein can use these graphic scripts to generate a 2D representation of the object. The graphics scrips can include code that provides a specific way of mapping the cage components onto the image. For example, the outlines of segments may each be associated with a parametric curve where the parameters may be coefficients of polynomials or other smooth functions (e.g., basic curves, Bézier curve, etc.) or a sequence of same. These curves can describe the shape of the segment. The Scalable Vector Cage may include some or all relevant information about each of the components (e.g., name, type, history, etc.). These Bézier curves can be efficiently run aligned to map onto a captured image. As an example, the curve may define a closed shape with an interior and the mapping process may look for all of one pixel colour (e.g., white) on the interior and all of another pixel colour (e.g., black) to be outside the closed shape. As each segment may have a Bezier curve associated with it which may further include additional information associated with that segment (e.g., a hierarchical naming scheme for that segment, colour of the segment, hierarchical colour of the segment, type of the object, name of the object, hash that relates the object to the image and the capture session).

In operation, the Scalable Vector Cages can be moved to the Graphics Processing Unit (GPU) memory wherein it can be manipulated there (e.g., alignment) to map it onto the captured images. Once its on the GPU memory there are special instructions to do multiple cases and multiple instructions simultaneously. The GPU may be configured to handle such manipulations more efficiently than the Computer Processing Unit (CPU). The GPU may be able to carry out these manipulation on a plurality of Scalable Vector Cages and for a plurality of captured images (e.g., different views) in parallel. Results of such manipulations can be carried over to CPU memory and used to efficiently adjust graphics transformations which render the cage onto an image or a web interface. As such, the Scalable Vector Cages represent a powerful tool both for computational efficiency and for segment-by-segment information tracking.

This process can be, for example, carried out using a graphics processing unit (GPU) and can be manipulated quickly in response to calculated results using a CPU. Scalable Vector Cages can contain information about the 3D configuration of an object as well as the individual segments that make the object up (e.g., in the form of the Bezier curves). When running the graphics script, the system can generate a 2D representation of the 3D information based on the alignment of the object. This 2D representation can then be compared to the object (e.g., a semantic mask). By generating a 2D representation of the object before comparison, the system does not need to track the 3D information about the object (e.g., locations and orientations of components) that are not visible in the image and can run comparisons on a more computationally efficient basis for different views of the object.

Embodiments described herein can involve semantic masks and semantic segmentation models. A semantic mask can be a result of an equivariant transformation of the image that defines semantic classifications (e.g. object component identifiers). The output is also an image that preserves the bitmap structure (e.g. aligning with the initial image). Semantic segmentation models can be parametric machine learning models that learn to produce semantic masks. In some embodiments, the system further comprises one or more machine learning models that use the images and cages to produce output indicating conditions of components of the object.

Furthermore, this process can also provide the technical benefit of efficiently segmenting the object into its constituent parts by comparing a pre-segmented cage and defining the segments in the captured image based on the overlay and alignment with the cage. Segmenting an object in this manner may provide a more efficient way of identifying and reporting defects or damage to the object, and storing information in the context of data transfer protocols.

In addition, some methods for damage identification rely on a classification of individual pixels in coloured images based on the outputs of a neural network and corresponding pixel-wise classification of the imagery data. This kind of algorithm can be referred to as a segmentation algorithm. Based on the information being captured from the imagery data, this segmentation algorithm can treat the classification of pixel-arrays in different ways. Different segmentation algorithms include "segmentation", "semantic segmentation", "panoptic segmentation", "instance segmentation", and "binary segmentation". These approaches may have challenges in providing a detailed classification of small components and in identifying rare components. In order to alleviate these challenges, a very large labelled dataset may be required, involving detailed pixel-level annotations that can be very cumbersome to generate.

Scalable Vector Cages can offer a solution for photo-based inspections, particularly in the context of online marketplaces, human-in-the-loop (HITL) systems, and digital transactions. Its use of advanced machine learning techniques and its standardized representation of the object type may allow for more accurate and efficient inspection and assessment of an object's quality and value. In some embodiments, the system further comprises one or more machine learning models that use the images and cages to identify and assess conditions of components of the object.

Systems and methods described herein can facilitate an online platform for the transfer of objects (particularly large objects made of many components such as vehicles). In particular, the systems and methods described herein can improve image capture, alignment, segmentation, and assessment. Such improvements can facilitate online platforms or apply to other applications.

For example, the Scalable Vector Cages approach can be used is in the inspection of cars from photos. By identifying and classifying the various components of a vehicle in an image, such as the tires, wheels, doors, windows, and body panels, inspectors or machine learning models can use the Scalable Vector Cages approach to quickly identify and assess any damage or issues with specific components of the vehicle. A Scalable Vector Cage can define segments of the object, such as parts of a vehicle. For example, a Scalable Vector Cage can be a script to define individual components of a vehicle and label the components according to their condition by processing images of the vehicle.

The Scalable Vector Cages approach could also be helpful in other inspection scenarios, such as pre-purchase inspections, insurance claims assessments, or accident damage assessments. By providing a more precise and detailed understanding of the various components of the object being inspected, the Scalable Vector Cages approach may help improve the accuracy and efficiency of inspections.

The Scalable Vector Cages approach can use 2D images of objects. Scalable Vector Cages can also use other representations (e.g., to create 3D models from 2D images) in other embodiments. For example, one possible approach to creating 3D models using Vector Cages could involve using the 2D outlines to create 3D model of the object. In some embodiments, the 3D model may be further refined and improved based on additional images and data.

Described herein are systems and methods for object part segmentation. These systems and methods can implement a database of numerous unique models (via Scalable Vector Cages (SVG), herein cages) with, for example, numerous distinct exterior parts. These systems and methods can be capable of producing granular part descriptions.

Individual cages can be crafted to outline and define each part's exact shape, position and classification using a cage creation tool. These object cages serve as a reference point that machine learning processes may use in addition to any available pixel arrays. By considering the pixel arrays that have been captured by a user and the outputs of any machine learning algorithms, the systems and methods described herein may identify the settings of the camera view that are needed to accurately align the Scalable Vector Cages with outputs of machine learning algorithms. This can result in a robust machine learning algorithm for segmenting parts and effectively localizing any damage or defects. The systems and methods described herein can, for example, detect and classify more than one unique part in any given image, regardless of the capture device or conditions. This approach may be significantly more data efficient thereby eliminating challenges that come with existing approaches.

One example use is for vehicles. In such an example, the object type may be based on the vehicle's make and model. Scalable Vector Cages may be highly adaptive to minor body style differences between specific vehicle models in different regions, making them versatile for a wide range of applications. This capability is particularly crucial when using Scalable Vector Cages for, for example, particular vehicle models that may have different body styles in other markets. For example, a 2012 Toyota Corolla manufactured for the North American market may have slightly different body styling if made for Germany, with more "European" style features. The systems and methods described herein can be configured to adjust the Scalable Vector Cages to align with these differences, ensuring accurate and effective use of the technology across diverse markets and regions.

Continuing with the vehicle example application, the systems and methods described herein may provide enhanced accuracy and reliability in identifying and positioning, for example, every one of the 255 unique exterior vehicle parts to including small items like sensors on bumpers and mirrors. Scalable Vector Cages may provide a new standard in vehicle inspection technology.

Furthermore, systems and methods making use of Scalable Vector Cages may be able to perform one-shot learning. For example, the system may be configured to carry out identifying and/or mapping a Scalable Vector Cage onto an image. Such a system may be capable of receiving the information for a new Scalable Vector Cage (e.g., for a new vehicle type) and efficiently mapping and/or identifying that new object in a captured image without ever having been trained with that object type. This makes the use of Scalable Vector Cages powerful for objects wherein there may be new object types added wherein the system will not be able to be trained with them or can not provide results of sufficient quality with the limited labeled data available (e.g., cars of different makes and models and with minor variations).

In some embodiments, the systems and methods described herein can be used for general digital marketplaces (e.g., eBay, Facebook marketplace, etc.). Users may be able to put many different object types up for sale (e.g., merchandise, mass produced products, supplies, etc.). In uploading these objects onto the digital marketplace, the user may be prompted or otherwise permitted to use the object segmentation process described herein to analyze the object. In these embodiments, it may first be necessary to determine whether the object has a corresponding pre-built Scalable Vector Cage stored in the platform. In some embodiments, the user may, for example, look the object type up in a database to determine whether a corresponding Scalable Vector Cage exists. In some embodiments, the system may, for example, determine whether a corresponding Scalable Vector Cage exists by conducting a preliminary analysis of a captured image of the object. Other methods of retrieving a corresponding Scalable Vector Cage are conceived. In some embodiments, where no Scalable Vector Cage exists, the system may be configured to capture images and/or other information about the object in order to generate a Scalable Vector Cage and label the parts therein. Once a corresponding Scalable Vector Cage is retrieved, the platform may align the Scalable Vector Cage with any captured images of the object to segment the object into its parts. The platform may also be configured to assess the object based on damage, deviations, other irregularities. The platform may be able to assign the damage, deviations, or irregularities to parts of the object. The platform may be configured to provide this information to prospective buyer to ensure they are properly informed of the object's quality. In some embodiments, the platform may be able to use the assignment of damage, deviations, or irregularities to the parts to ascertain the reconditioning cost or fair market value of the object. In some embodiments, the platform may use sales data of other objects of the same type to estimate the reconditioning cost or fair market value. In some embodiments, the platform may be configured to suggest other objects of the same type that may be suitable to use for replacement parts (e.g., if object A has a damaged casing, then the platform may further suggest purchasing object B which may be entirely broken aside from its casing and may therefore provide a suitable replacement casing for object A). Other outputs are conceived.

In some embodiments, the systems and methods described herein can be used as part of the inspection process for, for example, critical infrastructure (e.g., roadways, bridges, energy infrastructure, dams, buildings, etc.). For example, infrastructure which is difficult to visually inspect (e.g., because it is dangerous or difficult to physically visit, because it is remote, etc.) may benefit from a system configured to assess the infrastructure using remote or autonomous inspection devices (e.g., unmanned aerial vehicles equipped with image or video capture devices). In these systems, the remote or autonomous vehicles may be configured to retrieve images or video of the relevant infrastructure. In some embodiments, the images retrieved will be images from predefined locations at predefined angles. In some embodiments, the images can be retrieved at any location or angle. In some embodiments, video is captured and a full view of the infrastructure can be produced from the video (e.g., by stitching frames of the video together to generate a full image or by generating a 3D model of the infrastructure). In some embodiments, the images captured may be of an exterior, interior, or of specific internal components of the infrastructure. In these implementations, the images (or video) captured by the remote or autonomous devices can be compared to a Scalable Vector Cage corresponding to the infrastructure to segment the infrastructure into its component parts. In some embodiments, the Scalable Vector Cages corresponding to the infrastructure may be a general Scalable Vector Cage (e.g., where the infrastructure spec is highly standardized). In some embodiments, the Scalable Vector Cages corresponding to the infrastructure may be tailor made to the specific infrastructure asset (e.g., where the infrastructure is unique). The tailor made Scalable Vector Cages may be generated manually or automatically based on the infrastructure asset's plans or during its life (e.g., after it is built). In some embodiments, the Scalable Vector Cages may be generated in part based on general features and in part be tailor made (e.g., default Scalable Vector Cages of component parts such as valves or piping may be combined with tailor made Scalable Vector Cages of other parts such as specific floorplans into a full Scalable Vector Cages corresponding to the full infrastructure asset). The images can further be assessed for damage, defects, irregularities, wear, or other concerning aspects. The damage, defects, irregularities, wear, or other concerning aspects can be mapped to parts of the infrastructure using the full Scalable Vector Cage. The parts to which, for example, damage is observed may further inform applicable next steps. For example, weathering observed on an exterior wall of a dam may be within safety standards, but the same weathering observed on a water intake pipe may prompt a further inspection or reconditioning or replacement of the piping. The output of such an implementation may be used to, for example, generate a status report for the infrastructure, provide recommendations to preserve the integrity of the infrastructure, automatically prompt further action (e.g., place work orders for replacement parts or repair work), or other actions.

The Scalable Vector Cages approach may also be applied in manufacturing (e.g., to classify the components of products on assembly lines, ensuring that each part may be correctly identified, positioned and/or free of defects), robotics (e.g., to help robots accurately identify and manipulate objects and parts thereof, enabling them to possibly perform tasks with greater precision and accuracy) medical imaging (e.g., to identify and track specific parts of the human body, which may aid in the diagnosis and treatment of medical conditions), autonomous vehicles (e.g., to identify and respond to objects on the road, which may improve safety and reduce accidents), and/or augmented reality applications (e.g., to place virtual objects within real-world environments, which may create more realistic and immersive experiences).

In some embodiments, the Scalable Vector Cages approach may be used to image and segment parts of the human body. Such applications may assist in the accurate and expedient diagnosis and thus treatment of diseases or other conditions. In such medical embodiments, the patient may be scanned with a variety of imaging modalities (e.g., visible light, X-ray, ultrasound, nuclear imaging, etc.). In some embodiments, the Scalable Vector Cage may be generated for each patient based on their biographical details (e.g., height, weight, known medical issues, etc.). In some embodiments, the Scalable Vector Cage may be based on past images taken of the same patient (which may be particularly useful to track new issues as they emerge). A pre-generated Scalable Vector Cage may be configured to modify with the patient as they change (e.g., a child's Scalable Vector Cage may updated based on expected growth of the child since their previous visit). In some embodiments, the Scalable Vector Cage is based on specific parts of the patient (e.g., a cage of a specific organ or body part to further assess and elucidate any disease or damage to the sub-parts). The medical system may be configured to compare a patient's Scalable Vector Cage to the images captured of the patient to better segment any observed anomalies (that may be indicative of a disease or condition) onto specific parts of the patient. This may be useful to accurately assess damage or defects in very small parts of certain organs or other patient structures which may be difficult to analyze using other pixel-wise segmentation methods. This may further be useful to track the condition of a patient to ascertain, for example, if they are ameliorating or not. The output of such a system can include, for example, a report of the patient's condition, intelligent recommendations for treatment (or management), or automatic next steps (e.g., automatically ordering further tests).

Applications of the present systems and methods may include inspection of any object type made up of parts, including, but not limited to merchandise, industrial equipment, aircraft parts and components, construction equipment and machinery, medical equipment and devices, electronic devices and components, furniture and fixtures, agricultural machinery and equipment, marine vessels and components, manufacturing machinery and equipment, power generation and distribution equipment, scientific instruments, equipment, etc.

Example System Implementation

FIG. 1 illustrates a block schematic diagram of an example system 100 for object segmentation and defect identification, according to some embodiments.

The system 100 can be used to align images captured by a user 10 with a cage. This cage can be used to segment the captured image into its constituent components. These segmented components may further be used to ascertain and/or localize any damage or defects existing in the constituent components and may further be configured to estimate reconditioning costs and/or fair market value.

The system 100 can include an I/O Unit 102, a processor 104, communication interface 106, and data storage 108. The processor 104 can execute instructions in memory 110 to implement aspects of processes described herein. The processor 104 can execute instructions in memory 110 to configure an alignment engine 120, a recognition engine 122, application programming interface (API) 124, and other functions described herein. The system 100 may be software (e.g., code segments compiled into machine code), hardware, embedded firmware, or a combination of software and hardware, according to various embodiments. The system 100 may further comprise other components within its data storage 108 such as databases 112, to provide stored data to memory 110, and persistent storage 114.

The system 100 can implement a task manager process to divide the data computation process into different tasks to be dispatched to different processors. For each of the captured images, the system 100 may have defined specific tasks to be performed for each view of the images, which varies depending on the content of the specific images collected. The tasks can be, for example, dispatched to different agents (if agents are part of the system processes) simultaneously for an efficient data process.

The I/O unit 102 can enable the system 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

The communication interface 106 can enable the system 100 to communicate with other components, to exchange data with other components, to access and connect to network resources, to serve applications, and perform other computing applications by connecting to a network 140 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The data storage 108 may be configured to store information associated with or created by the system 100, such as for example image data, cage data, metadata, object metrics, cost data, valuation reports and so on. Data storage device 108 can include memory 110, databases 112 (e.g. cage database), and persistent storage 114. The data storage 108 can implement databases 112, for example. Storage 108 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

Memory 110 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The system 100 can have an alignment engine 120 to align the captured images with a cage. The alignment engine 120 may determine which cage type to use based on the captured images, metadata, inputs from the user, a serial or identification number (e.g., a vehicle identification number or VIN), or another source. The cage defines segments of an object of that type. The alignment engine 120 can use numerous methods to align the captured image such as by using Image Registration. Image Registration is the process of transforming different data sets into one coordinate system to be compared and analyzed. In aligning two images, Image Registration can find the geometric transformation that maps one embodiment onto the other. This transformation may include translation, rotation, scaling, and/or distortion correction. One method of Image Registration includes generating a semantic mask from the captured images using semantic segmentation models and optimizing for a best homography matrix (defining a composition or rotations, translations, scaling and/or distortion correction to align the cage with the semantic mask) between the cage and the semantic mask. The homography matrix may also be referred to as a perspective transformation in the context of 3D modeling, or as the camera matrix transformation, or as an affine transformation in the context of 2D models (images). Upon alignment, the captured images can have their segments (e.g., parts) defined based on segments defined in the cage. The alignment engine may make use of a GPU to carry out some or all of the alignment procedures. Variables from the I/O Unit 102 may initially be put into a CPU memory where they may be formatted in such a way that it can be efficiently concatenated with other requests for GPU processing and subsequently loaded into the GPU for processing. The SPU can take on a plurality of requests and run the computations in parallel. The output may modify information the in CPU memory based on the calculation that was done in GPU memory. Exploitation of the differing processing units can be referred to as heterogenous computing.

In an example implementation the cage and the semantic mask can be compared as two binary arrays of a same shape. Each element in the array represents a pixel in the image. The element's value indicates whether that pixel is part of the object represented by the cage or the semantic mask. The binary arrays are compared to align the cage with the semantic mask, and a homography matrix is optimized to minimize the difference between them. This process involves finding the best rotation, translation, scaling, and/or distortion correction combination to align the cage with the semantic mask. The result of this process is a transformed cage that is aligned with the semantic mask. The alignment can be assessed by comparing the transformed cage with the original semantic mask and evaluating the difference between them. Other comparative methods could be used to align two images, such as Cross-Correlation or Feature Matching. Cross-Correlation involves calculating the similarity between two images by sliding one over the other and comparing the pixel values at each position. Feature Matching involves identifying distinctive features in each image and then matching those features to find corresponding points in both pictures.

In some embodiments, a minimal shape of the object (e.g., a rectangle for vehicles) may be compared to the semantic mask in place of the cage. This can be useful where the cage is not known initially (e.g., where the system also needs to determine which cage to apply). Using the minimal shape can help establish the homography matrix that can then be applied to cages when testing cage match to determine the best cage fit. A second alignment step can further be performed when determining which cage best matches the semantic mask. This second alignment step can seek to compute the optimal alignment using second order gradient descent methods that consider the slope of the gradient descent optimization process. This process may provide good convergence properties which that can be run with multiple cages simultaneously.

In some embodiments, the alignment may make use of hierarchical alignment. For example, the captured image may initially have the shape of a full object detected (e.g., identifying the vehicle as opposed to the background) and one or more cages may be aligned against that shape. This may give a rudimentary initial alignment and a means of excluding cages that cannot match at this rudimentary level. The captured image may then have segments of a certain type identified (e.g., broad categories of segments which, for a vehicle, may include the body, the parts (e.g., mirror, headlights, etc.), windows, tires, and wheels) and the cage or cages may be aligned at this level. Finally the individual segments of the cages may be mapped to the captured image to determine which is the best cage or to fine-tune the alignment (e.g., determining how the graphics should be modified to overlay the cage). This process may provide a computationally efficient method of reaching alignment based on a captured image. The alignment technique the minimal cost associated with using the cage instead of the mask (defined in terms of, for example, the Kullback-Leibler divergence, the negative likelihood score or the mean squared error) may be sought. Where identifying the best matching cage, then the individual cost scores for each cage can be determined and the cage with the lowest score selected.

The system 100 can have a recognition engine 122 to, for example, process the captured images and/or metadata to compute object metrics. The recognition engine 122 processes the images that are captured by the object capture modules 132. Images initially are processed to determine if the images can be processed by determining if the appropriate brightness, clarity of the images and other factors (e.g., cleanliness of an interior). If the images cannot be processed this is communicated to the user through interfaces of the object capture module 132 along with further instructions. If the user is unable to rectify the issue due to surroundings, time-of-day or weather the system 100 is able to schedule a notification for another date and time to complete the appraisal. In some embodiments, images by the recognition engine 122 are then processed to identify specific sections and body parts of the vehicle. The recognition engine 122 uses the aligned cages to identify different locations or components of the object shown in the images.

The damage shown in the image is then linked to the respective location or component. These sections are then inspected by the system 100 to detect any defects or issues. In some embodiments, the system 100 uses the recognition engine 122 for analyzing the captured images to determine, for example, vehicle metrics such as the exterior and interior color, odometer reading, any detected paint chips, scratches, defects and dents listing the affected body parts and the severity of damage. The recognition engine 122 can be configured to recognize other aspects or features of the parts of an object (e.g., other deviations from a standard or ideal model). The recognition engine may also make use of heterogenous computing.

In some embodiments related to vehicles, the system 100 can also use recognition engine 122 to process image data to detect what the remaining tread life is on the tires, any chips and cracks on any glass parts, condition and type of wheels/rims and any illuminated OBD-2 instrument lights any noises that may indicated engine, exhaust, loose belts or any other audibly detectable mechanical issues. The object capture modules 132 can be used to define metadata that can be processed along with the captured image data to compute object metrics.

For vehicular examples, images containing the vehicle's VIN are processed and the detected barcode and data is sent to an integrated VIN decoder to gather the vehicle metrics like year, make, model and trim. Images of the tire tread can be analyzed to detect the depth of the tread, any signs of weathering and tire type. The images of the instrument cluster are processed to recognize characters to capture the odometer reading and if the mileage is measured in kilometers or miles. The recognition engine 122 can implement or integrate with different tasks that can be dispatched to different processors (or agents should they be used in a system implementation), for example. The tasks can be linked to different images or to different segments.

Continuing with the vehicle example, the alignment engine 120 and/or the recognition engine 122 can access a repository of cages for vehicles to identify different components of the vehicle. There can be a different cage for each type of vehicle (e.g. make and model). The type of vehicle can be linked to a VIN, for example. The recognition engine 122 can compute metrics to assess damage on the vehicle shown in an image relative to a location or component of the vehicle. The cage can be used to define the location or component. The cage can provide a reference for the location or component so that it can be aggregated with other reference or location data in a common way (via the cage definition). For example, an image may indicate damage on the back left corner of the vehicle body. The cage as aligned with the captured images of a vehicle can be used by recognition engine 122 to determine that an image shows damage to a specific part of the vehicle by cross-referencing the location of recognized damage to the location in the aligned cage. The cage data can thus provide an anatomy of the vehicle. The image (showing the damage) can be routed to an improved interface application 130. In some embodiments, cages are mapped on to the captured images to identify the best matching cage.

In some embodiments of system 100, the alignment engine 120 and the recognition engine 122 can work in parallel. For example, the system 100 may work simultaneously to align the cage with the captured image using the alignment engine 120 and detect damage or defects using the recognition engine 122. These results may, when completed, be combined and the damaged segments identified by cross-referencing the identified damaged in the captured image with the segment location in the aligned cage.

The system 100 can be operable to register and authenticate users (using a login, unique identifier, and password for example) prior to providing access to applications, a local network, network resources, other networks and network security devices. The system 100 can connect to different machines, and/or data sources.

The system 100 configures an interface application 130 with an object capture module 132 to capture images of an object and/or metadata for the captured images. The system 100 may configure an interface application 130 with visual elements to guide a user through an image capture process using object capture module 132, based on, for example, specified angles and views. In some embodiments, the system 100 may have other methods to capture images (e.g., taken at fixed times to identify possible object in a field of view or taken as objects emerge from an assembly line). In some embodiments, the capture module may be configured to capture images by pulling frames from a feed of video. In some embodiments, the images may be captured in some other way from the video feed. In some embodiments, alternative imaging methods (e.g., infrared, UV, ultrasonic, etc.) may be used to capture images of the object based on other imaging modalities.

The system 100 can have an application programming interface (API) 124 to integrate with other systems for data exchange.

The system 100 may optionally have a cost estimation tool to process object metrics to detect defects of the object and compute cost data for repair of the defects. The system 100 may have a valuation tool to compute a market value estimate for the object using the object metrics and the cost data. The system 100 can implement different machine learning methods for determining the condition, estimated reconditioning costs and estimated market value, for example, by participating as an autonomous third-party validation source between the seller and the buyer.

In some embodiments, system 100 has a Scalable Vector Cages (SVC) Repository in data storage 108. The system 100 uses cages to identify each component of the vehicle and link each type of damage to respective components. In some embodiments, the cage data can be used to generate an interactive guide to aide the user 10 in capturing images of the object. In some embodiments, the system 100 has a cage repository manager. The system 100 can generate an interface for the cage repository manager. The interface can list all cages in data storage 108 along with attributes or properties of the cages. Example attributes for vehicle cages include type, make, model, year, body, trim, code, status.

In some embodiments, the interface application 130 dynamically configures for a user 10 as part of an image capture process or an image review process. In some embodiments, the interface application 130 dynamically configures the object capture module 132 based on an object type. The object type can be linked to one or more cages maintained by the system 100. The interface application 130 can compute the object type, for example, by capturing or scanning an identification or serial number from a barcode (for example, scanning the VIN). In some embodiments, the object capture module 132 generates visual elements corresponding to an object shape to facilitate the image capture process. Once the object type identified the system 100 can retrieve the relevant cage based on which view is captured. The system 100 can use the cage to generate a silhouette as an SVG file (as an illustrative example) that is used by the user interface process to guide the user on the required alignment needed to frame the object. The overlay can be based on cage data. The cage data can be used to render the shapes on the interface to help the image capture process.

The visual elements can be overlays that can be aligned with the object to capture an image of the object. In some embodiments, the object capture module 132 generates visual elements corresponding to different parts of the object to generate the metadata. The metadata can indicate a location on the image and a corresponding descriptor label. The system 100 links this metadata to different locations of the object using the cage. This provides the metadata required to know the shape and location ordinance of the entire anatomy of the object that is visible within the image. For example, for an object, the metadata can be used to label parts of the image of the object or to indicate defects or marks.

According to an aspect, there is provided a system 100 for classifying segments of an object, the system 100 including a server 108 having non-transitory computer readable storage medium with executable instructions. The executable instructions for causing one or more processors to process captured images using a plurality of cages to identify a cage for image alignment, the cage defining segments of the object, align the captured images onto the cage to identify segments of the object in the captured images using alignment engine 120, and detect one or more physical conditions (e.g., defects) of the segments of the object in the captured images using recognition engine 122.

In some embodiments, the object includes a vehicle.

In some embodiments, the server 108 is further configured to cause one or more processors to configure an interface application 130 with an object capture module 132 to capture the images of the object.

In some embodiments, the object capture module 132 captures metadata for the captured images and the server is further configured to use the metadata to process the captured images.

In some embodiments, the cage is for an object type.

In some embodiments, the server 108 retrieves the object type based on a serial or identification number of the object.

In some embodiments, the cage includes one or more different cage views.

In some embodiments, the cage can be rendered with segment outlines of varying widths.

In some embodiments, the cage is used to capture the outlines of segments of the object segments and render them at varying widths and of varying colours. Similarly the cage can be used to capture the interiors of object segments.

Varying the edge thickness can aide in edge detection as it can cover a greater area of the captured image which may include border pixels. This may thereby reduce the complexity of a machine learning algorithm that is identifying the edges.

Different colours may correspond to different categories. The colours can be based on a hierarchical segment classification system.

In some embodiments, the cage includes a 3D model.

In some embodiments, the server 108 can generate a virtual representation of the object using the captured images and the cage.

In some embodiments, the server 108 can identify the object type based on the captured images.

In some embodiments, the server 108 can compute cost data for repair of the one or more defects.

In some embodiments, the processor is configured to align the captured images onto the cage by generating a semantic mask from the captured images using semantic segmentation models and optimizing a homography matrix between the cage perspective view and the semantic mask which preserves the camera view. The homography matrix compactly defines a composition of rotations, translations, scaling and/or distortion correction to align the cage with the semantic mask, wherein the cage and the semantic mask are compared as two binary arrays of a same shape.

According to an aspect, there is provided a system for classifying segments of an object. The system including a server having non-transitory computer readable storage medium with executable instructions. The executable instructions for causing one or more processors to configure an image alignment process for captured images to align the captured images onto a cage, the cage defining segments of the object, and a recognition engine to process the captured images to classify one or more of the segments of the object according to different types of physical condition.

In some embodiments, the alignment process can enable one-shot learning for advanced computer vision methods that operate on images in a pixel format to align predictions of the captured images onto the cage such as by generating a semantic mask from the captured images. The cage can facilitate further training pre-trained semantic segmentation models to produce accurate labels for objects that have a limited variety of labels available. This process can be end-to-end differentiable and can be carried out through a second order optimization of the homography matrix parameters for the perspective transformation between the cage and the semantic mask to produce an optimal alignment which are specific to object type and its environmental conditions, wherein the homography matrix defines a composition of rotations, translations, scaling and/or distortion correction to align the cage with the semantic mask, wherein the cage and the semantic mask are compared as two binary arrays of a same shape.

According to an aspect, there is provided a system for training the systems 100 described above.

Image Capture Details

In the foregoing example, the images of the object were captured via an object capture module 132 as part of interface application 130. It is to be understood that the systems and methods described herein are technologically agnostic to image source and many different image capture methods and modalities may be used. The image capture module 132 need not be part of an interface application 130. In some embodiments, images may be captured automatically by remote or autonomous systems. In some embodiments, images may comprise video feed. In some embodiments, images may comprise other imaging modalities such as UV detection, ultrasound, infrared, nuclear imaging, etc. In some embodiments, a user may upload images originating from a camera external to the system into the system and the system may be configured to segment and analyze those images. In such embodiments, the system may be configured to conduct a preliminary review of the images to ensure they meet any quality and/or angle requirements (that may exist). In some embodiments the images may be captured using multiple cameras (e.g., cameras configured to capture an object at different angles, cameras positioned along an object's path to capture images as an object travels, etc.). In such embodiments, further systems and algorithms may be configured to correlate images captured from multiple cameras to the same object instance and/or to correlate the images to each other. Other image sources, imaging modalities, and imaging capture methods are conceived.

Example Method

Figure 2A:
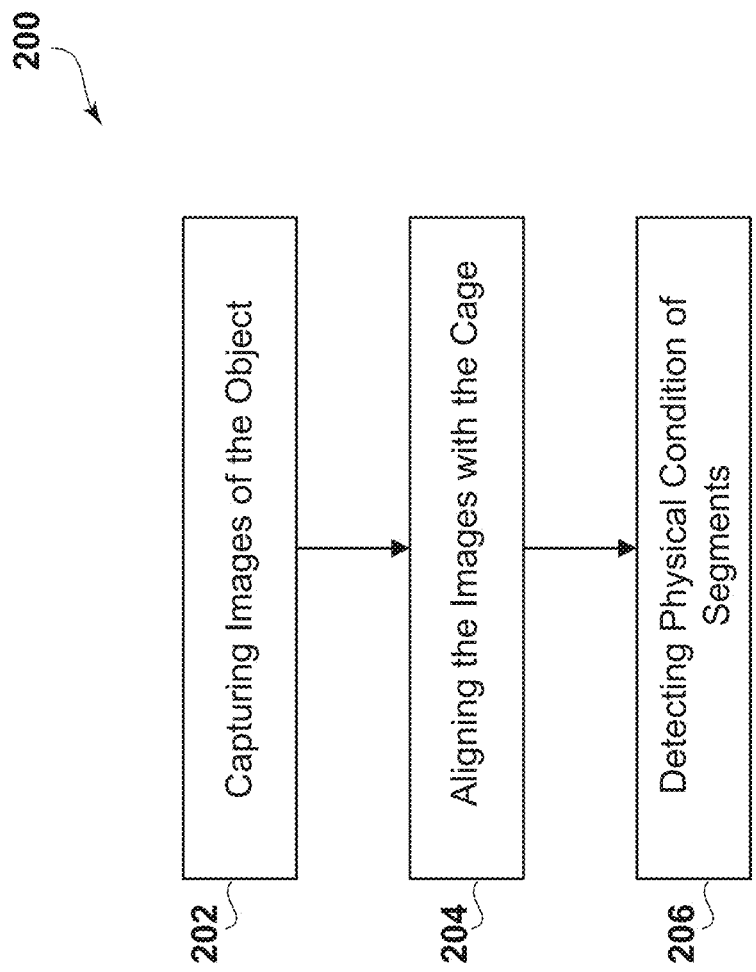

FIG. 2A illustrates a process diagram of a method 200 of detecting defects in segments of an object, according to some embodiments.

The method comprises the steps of Capturing Images of the Object (202), Aligning the Images with a Cage (204), and Detecting Physical Condition of Segments (206).

In operation, the method 200 may begin, for example, with a user 10 capturing images of the object (e.g., a vehicle) (step 202) using, for example, an object capture module 132. The interface application 130 may provide guidance to the user as to how to capture the images (e.g., guidance on angles and brightness). The interface application 130 may provide the user guidance in the form of overlays on the interface application 130 to assist the user 10 in aligning the object with their object capture module 132. The interface application 130 may be configured to determine the object type (e.g., vehicle make and model) before capturing images (e.g., input from the user 10, scanning an identification or serial number such as a VIN, etc.) or while capturing images (e.g., analyzing the images to determine object type). In such embodiments, the interface application 130 may be configured to provide an overlay on the interface application 130 to guide the user in aligning the images based on the cage for that object type. In some embodiments, the cage may be the closest cage type to the captured object where a matching cage type cannot be found and/or identified. In some embodiments, a given image can be optimized with multiple different cages in parallel within GPU memory, based on a best matching cage from a set of candidate cages. In some embodiments, the process of identifying a best matching cage can be done with multiple images in parallel. In some embodiments, a plurality of images (e.g., from different perspectives) can be run against a plurality of cages in parallel to determine the best overall matching cage for all the images. These embodiments enable the system to retain a scalability that may be better than systems which utilize 3D models, such as 3D point clouds, 3D meshes or 3D Voxel Grids. In some embodiments, the cage may comprise a series of 2D views and the user 10 is directed to capture images corresponding to each of the views in turn. In some embodiments, the system is configured to detect which 2D view the user 10 is about to capture an image of and automatically show the relevant 2D view overlay. In some embodiments, the cage may comprise a 3D model and orient the model to overlay with the object at any angle (though guidance may still be provided to ensure the user captures a sufficient number of varied images). Other methods of capturing images of an object are conceived (e.g., capturing images of a field of view to detect objects and components thereof in the field of view, capturing images of objects as they emerge from an assembly line). In some embodiments, the method 200 can work in a drive through environment for vehicles (e.g. an enclosed area with cameras situated at desired locations to collect the required images as a user drives into the area).

The system may then align the images with a cage (step 204) using, for example, the alignment engine 120. The system may use outputs of computer vision models to 'see' the object in the captured images. If not already done so (e.g., as part of step 202), then the system may also retrieve the appropriate cage for the object type. It may retrieve the cage type appropriate for the object type based on a user input, a scanned identification or serial number (e.g., a VIN), the captured images, or some other method and compare those outputs to the cage for that object type. In some embodiments, the system may analyze the captured images to determine the appropriate cage. In some embodiments where the appropriate cage cannot be determined, the system may then select a cage that is similar to the captured object or it may generate a new cage (e.g., based on the captured images and/or other cages in its data storage). In some embodiments, the system may use semantic segmentation models to generate a mask of the object in the captured images. The system may then optimize a homography matrix (defining the composition of rotations, translations, and scaling required to align the cage with the semantic mask) by, for example, comparing the cage and the mask as two binary arrays of the same shape. In some embodiments, other computer vision models may be used to generate the computer vision output. Such models may include Object Detection Models (which can identify the presence and location of objects within an image, and could be useful for identifying the object type and its components within the captured images), Instance Segmentation Models (which can not only identify the presence and location of objects within an image, but also differentiate between multiple instances of the same object and could be useful for identifying multiple objects of the same type within the captured images), Depth Estimation Models (which can estimate the depth of objects within an image and could be useful for determining the appropriate cage size for the object). In some embodiments, other methods of comparing the output from the computer vision model and the cage may be used. Once the captured images have been aligned with the cage, the captured images can be segmented using the segments defined by the cage. These segments can correspond to a variety of parts that make up the object (e.g., side door, tire, windshield, steering wheel, engine and subdivisions thereof, etc.). In some embodiments, the interface application 130 may be configured to carry out the operation of the alignment engine 120. In some embodiments another component carries out the operation of the alignment engine 120.

The system may then detect the physical condition such as for defects or damage in the segments of the captured images (step 206) using, for example, recognition engine 122. The system may analyze the captured images to determine whether there is damage or defects. This may be carried out over the whole image and then mapped to segments depending on where the damage is found in the captured image (and how that location maps to the cage) before, in parallel, or after step 204 or it may be carried out on a segment-by-segment process or on targeted parts (i.e., after step 204). In some embodiments, user 10 or someone else assesses captured images to identify defects or damage. In some embodiments, damage or defects are detected using computer vision methods. For example, in some embodiments, the system may compare the captured images to the cage to ascertain whether there are deviations consistent with damage or defects. This comparison can be between the whole image or carried out on a segment-by-segment basis. Other methods of defect detection are also conceived. In some embodiments, the interface application 130 may be configured to carry out the operation of the recognition engine 122. In some embodiments another component carries out the operation of the recognition engine 122. In some embodiments, the system may be configured to detect deviations which are not damage.

In some embodiments, the method may be configured to generate a virtual representation of the object using the captured images and the cage. For example, the method may generate a series of views based on the captured images, but aligned with the cage. As another example, the method may generate a virtual 3D model by applying the captured images onto a 3D cage. In these embodiments it may further provide an interactive view of the object, for example, by allowing the user 10 to see the segment-by-segment analysis and having the virtual model zoom in or otherwise focus on that segment.

According to an aspect, there is provided a method 200 for classifying segments of an object. The method 200 including aligning captured images onto a cage (block 204), the cage defining segments of the object and classifying one or more of the segments of the object from the captured images (block 206).

FIG. 2B illustrates another process diagram of a method 210 of detecting defects in segments of an object, according to some embodiments.

The method comprises the steps of Identifying a Cage (212), Aligning the Images with the Cage (214), and Detecting Physical Condition of Segments (216).

In operation, the method 210 may begin, for example, with a user 10 capturing images of the object (e.g., a vehicle) using, for example, an object capture module 132. The interface application 130 may provide guidance to the user as to how to capture the images (e.g., guidance on angles and brightness). The interface application 130 may provide the user guidance in the form of overlays on the interface application 130 to assist the user 10 in aligning the object with their object capture module 132. The interface application 130 or server 108 may be configured to determine the object type (e.g., vehicle make and model) while capturing images (e.g., analyzing the images to determine object type). In such embodiments, the system may process captured images to determine the best matching cage. In some embodiments, the cage may be the closest cage type to the captured object where a matching cage type cannot be found and/or identified. In some embodiments, a given image can be optimized with multiple different cages in parallel within GPU memory, based on a best matching cage from a set of candidate cages. In some embodiments, the process of identifying a best matching cage can be done with multiple images in parallel. In some embodiments, a plurality of images (e.g., from different perspectives) can be run against a plurality of cages in parallel to determine the best overall matching cage for all the images. These embodiments enable the system to retain a scalability that may be better than systems which utilize 3D models, such as 3D point clouds, 3D meshes or 3D Voxel Grids. The best matching cage may be determined using, for example, means squared error loss or some other optimization technique. In some embodiments, the cage may comprise a series of 2D views and the user 10 is directed to capture images corresponding to each of the views in turn. In some embodiments, the system is configured to detect which 2D view the user 10 is about to capture an image of and automatically show the relevant 2D view overlay. In some embodiments, the cage may comprise a 3D model and orient the model to overlay with the object at any angle (though guidance may still be provided to ensure the user captures a sufficient number of varied images). Other methods of capturing images of an object are conceived (e.g., capturing images of a field of view to detect objects and components thereof in the field of view, capturing images of objects as they emerge from an assembly line). In some embodiments, the method 210 can work in a drive through environment for vehicles (e.g. an enclosed area with cameras situated at desired locations to collect the required images as a user drives into the area).

The user may capture images of the object using, for example, a camera or other imaging device. The system may then retrieve the appropriate cage for the object type (block 212). It may retrieve the cage type appropriate for the object type based the captured images. For example, and as described above, it may run a series of cages against the captured image in parallel and determine which best matches the image. The system may further take other input based on a user input, a scanned identification or serial number (e.g., a VIN), or some other method and compare those outputs to the cage for that object type to reach a consensus for the appropriate cage. In some embodiments where the appropriate cage cannot be determined, the system may then select a cage that is similar to the captured object or it may generate a new cage (e.g., based on the captured images and/or other cages in its data storage). In some embodiments, the system may use semantic segmentation models to generate a mask of the object in the captured images. The system may then optimize a homography matrix (defining the composition of rotations, translations, and scaling required to align the cage with the semantic mask) by, for example, comparing the cage and the mask as two binary arrays of the same shape (block 214). In some embodiments, alignment may take place while identifying the cage (block 212). In some embodiments, other computer vision models may be used to generate the computer vision output. Such models may include Object Detection Models (which can identify the presence and location of objects within an image, and could be useful for identifying the object type and its components within the captured images), Instance Segmentation Models (which can not only identify the presence and location of objects within an image, but also differentiate between multiple instances of the same object and could be useful for identifying multiple objects of the same type within the captured images), Depth Estimation Models (which can estimate the depth of objects within an image and could be useful for determining the appropriate cage size for the object). In some embodiments, other methods of comparing the output from the computer vision model and the cage may be used. Once the captured images have been aligned with the cage, the captured images can be segmented using the segments defined by the cage. These segments can correspond to a variety of parts that make up the object (e.g., side door, tire, windshield, steering wheel, engine and subdivisions thereof, etc.). In some embodiments, the interface application 130 may be configured to carry out the operation of the alignment engine 120. In some embodiments another component carries out the operation of the alignment engine 120.

The system may then detect the physical condition such as defects or damage in the segments of the captured images (step 216) using, for example, recognition engine 122. The system may analyze the captured images to determine whether there is damage or defects. This may be carried out over the whole image and then mapped to segments depending on where the damage is found in the captured image (and how that location maps to the cage) before, in parallel, or after step 214 or it may be carried out on a segment-by-segment process or on targeted parts (i.e., after step 214). In some embodiments, user 10 or someone else assesses captured images to identify defects or damage. In some embodiments, damage or defects are detected using computer vision methods. For example, in some embodiments, the system may compare the captured images to the cage to ascertain whether there are deviations consistent with damage or defects. This comparison can be between the whole image or carried out on a segment-by-segment basis. Other methods of defect detection are also conceived. In some embodiments, the interface application 130 may be configured to carry out the operation of the recognition engine 122. In some embodiments another component carries out the operation of the recognition engine 122. In some embodiments, the system may be configured to detect deviations which are not damage.

In some embodiments, the method may be configured to generate a virtual representation of the object using the captured images and the cage. For example, the method may generate a series of views based on the captured images, but aligned with the cage. As another example, the method may generate a virtual 3D model by applying the captured images onto a 3D cage. In these embodiments it may further provide an interactive view of the object, for example, by allowing the user 10 to see the segment-by-segment analysis and having the virtual model zoom in or otherwise focus on that segment.

According to an aspect, there is provided a method 210 for classifying segments of an object. The method 210 including processing captured images using a plurality of cages to identify a cage for image alignment (block 212), the cage defining segments of the object, aligning the captured images onto the cage to identify segments of the object in the captured images (block 214), and detecting one or more physical conditions of the segments of the object in the captured images (block 216).

In some embodiments, the object includes a vehicle.

In some embodiments, the method 210 includes capturing images of the object.

In some embodiments, the method 210 includes capturing metadata for the captured images and using the metadata to at least one of align the captured images and detect the one or more defects.

In some embodiments, the cage is for an object type.

In some embodiments, the method 210 includes retrieving the object type based on a serial or identification number of the object.

In some embodiments, the cage includes one or more different cage views.

In some embodiments, the cage can be rendered with segment outlines of varying widths.

In some embodiments, the cage includes a 3D model of the object type.

In some embodiments, the method 210 includes generating a virtual representation of the object using the captured images and the cage.

In some embodiments, the method 210 includes identifying the object type based on the captured images.

In some embodiments, the method 210 includes computing cost data for repair of the one or more defects.

In some embodiments, the aligning the captured images onto the cage (block 214) includes generating a semantic mask from the captured images using semantic segmentation models, and optimizing a homography matrix between the cage and the semantic mask, wherein the homography matrix defines a composition of rotations, translations, scaling and/or distortion correction to align the cage with the semantic mask, wherein the cage and the semantic mask are compared as two binary arrays of a same shape.

According to an aspect there is provided a non-transitory computer recordable storage medium having stored therein computer executable program code, which when executed by a processor, causes the processor to carry out the methods 200 and 210 described above.

Example Implementation of the System

Damage and defects can be used to determine how the severity of this damage can affect the overall evaluation of the object. An example of a situation that requires this would be to explore how the impact of a minor dent on a vehicle is considered by the system 100 depending on the exact location of this type of dent. First, the system 100 sets a standardized tolerance of what is considered a minor dent or what would be considered instead as a medium, major or impact damage type of dent. Next, if a minor dent is detected in an image being processed by the system 100 it is also important to recognize the specific location and impacted component because this will determine the repair type for this specified minor dent that was detected. If this dent is on the left view of the vehicle and was found on the front door it might be considered a cold metal repair which indicates a minor paintless dent removal process that can be easily implemented with marginal impact on the desirability of vehicle and minimal cost to repair. However, if this same degree of dent was detected on the B pillar of the vehicle the reconditioning method would be different as the same paintless dent removal process cannot be performed in this location of the vehicle and this damage would be considered a minor body shop repair which requires the impacted component to be repaired by a professional body shop and the vehicle will be repainted to remedy which does cost more and impacts the vehicle's desirability differently. The system 100 can use cage data to determine damage position and may thus be able to factor location-based damage into any estimates of cost of reconditioning or fair market value. The system 100 can understand the difference of which component is the front door or the B pillar in performing vehicle condition evaluations.

Approaches to Segmentation

Figure 3:
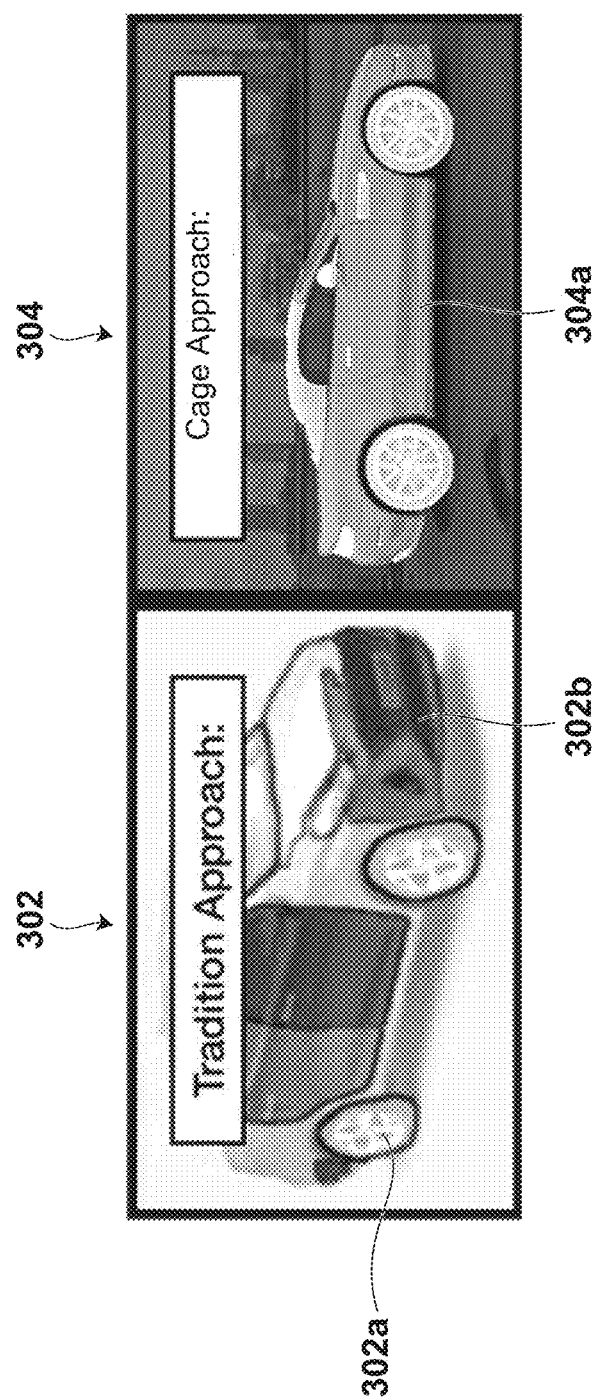
FIG. 3 illustrates different approaches to object segmentation, according to some embodiments.

FIG. 3 illustrates different approaches 302 and 304 to object segmentation, according to some embodiments.

In approach 302, the system performs a pixel-wise comparison of individual pixels in coloured images. These approaches may be able to ascertain that different regions of a captured image correspond to different segments of the object (e.g., in approach 302, segment 302*a* is the tire and segment 302*b* approximately corresponds to the front bumper). These approaches may have challenges in providing detailed classification of small components and in identifying rare components. In order to alleviate these challenges a very large labelled dataset may be required, involving detailed pixel-level annotations that can be very cumbersome to generate.

In approach 304, the system performs a comparison of the whole object to the Scalable Vector Cage (SVC) 304*a* to identify how the SVC 304*a* maps on top of the object in the captured image. The SVC 304*a* itself holds information related to the positioning of segments relative to the whole object. This information may have been manually designed in advance or it may be automatically generated beforehand based on ideal captured images of an object type (e.g., captured images of an ideal object type (e.g., a vehicle fresh off the assembly line) may be segmented by a computing device and that file may be stored for later use). As such rather than conducting a pixel-wise comparison for each pixel in the image, the system is able to efficiently segment the captured image by accurately positioning the SVC 304*a* on top of the whole object. Such an approach may be more efficient for processing and may be able to more readily segment small or rare parts that a pixel-wise comparison may struggle with. For example, with vehicles, this approach may be more computationally efficient for areas such as a vehicle's interior or under it's hood (i.e., where the system may need to identify a number of small components or rarer components).

Example Vehicular Method

Figure 4:
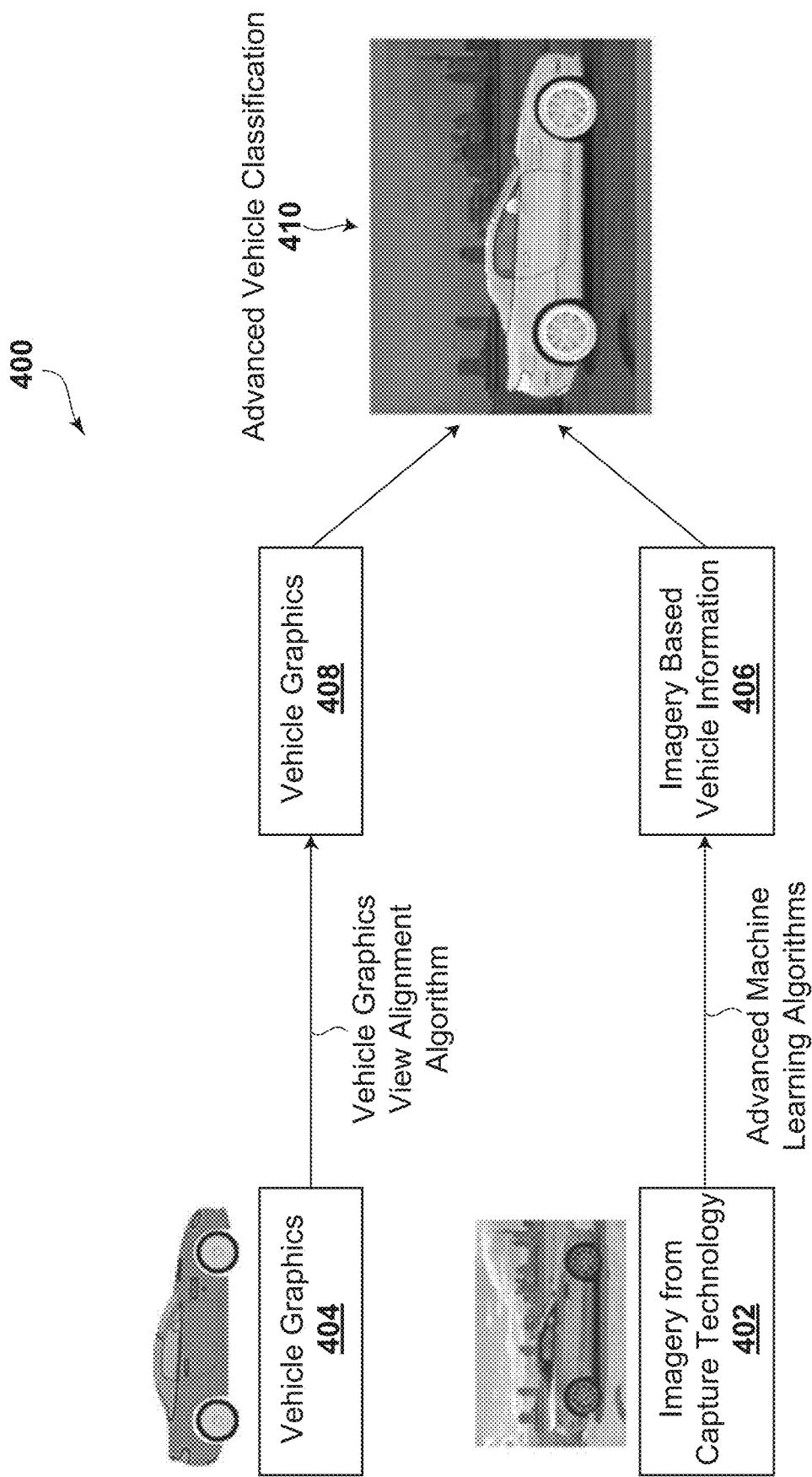
FIG. 4 illustrates a process for aligning a captured image with a cage, according to some embodiments.

FIG. 4 illustrates a process 400 for aligning a captured image with a cage, according to some embodiments.

In this exemplary process 400, the user 10 captures an image of the object (here a vehicle) (402). The image is then processed using advanced machine learning algorithms to extract imagery based vehicle information (406). In some embodiments, process 400 can process the image using various semantic segmentation algorithms that use Deep Neural Networks to process images in a pixel format. In some embodiments, process 400 can use prompt based segmentation approaches and Generative AI methods for image processing. Process 400 can use any advanced image processing transformations of the image that can produce informative representations of regions of pixels confined within the various components of the SVC. The imagery based vehicle information can include information such as the make and model of the vehicle (e.g., through a VIN), the location and extent of any damage or defects, information from the instrument cluster (e.g., odometer, engine lights, etc.), etc. Other information is also conceived.

The system pulls an appropriate Scalable Vector Cage. Scalable Vector Cages may be stored in a computing device, a remote server, or elsewhere. In some embodiments, the Scalable Vector Cages type may be selected based on information extracted from the captured image. The Scalable Vector Cages are then processed using a Scalable Vector Cages View Alignment Algorithm to align the Scalable Vector Cages with the captured image (408).

These two processes are then combined as the Advanced Vehicle Classification 410. This Advanced Vehicle Classification 410 comprises the captured image with any imagery based vehicle information with the Scalable Vector Cage (or cages for multiple views) superimposed thereon. In having superimposed the Scalable Vector Cage on the captured image, it may be possible to identify the location of any defects or damage done to the vehicle based on its location relative to the overlaid Scalable Vector Cage. The system may further use this information to provide an appraisal report or estimate repair costs and/or fair market value of the vehicle.

Example Vehicular Cage

In some embodiments, Scalable Vector Cages can be used to distinguish between thousands of makes and models of vehicles. These Scalable Vector Cages can further be used to distinguish between 255 or more parts of the vehicle in a captured image. The Scalable Vector Cages may only require annotation once (for example, by a person or through computer algorithms such as those generated by machine learning).

Figure 5:
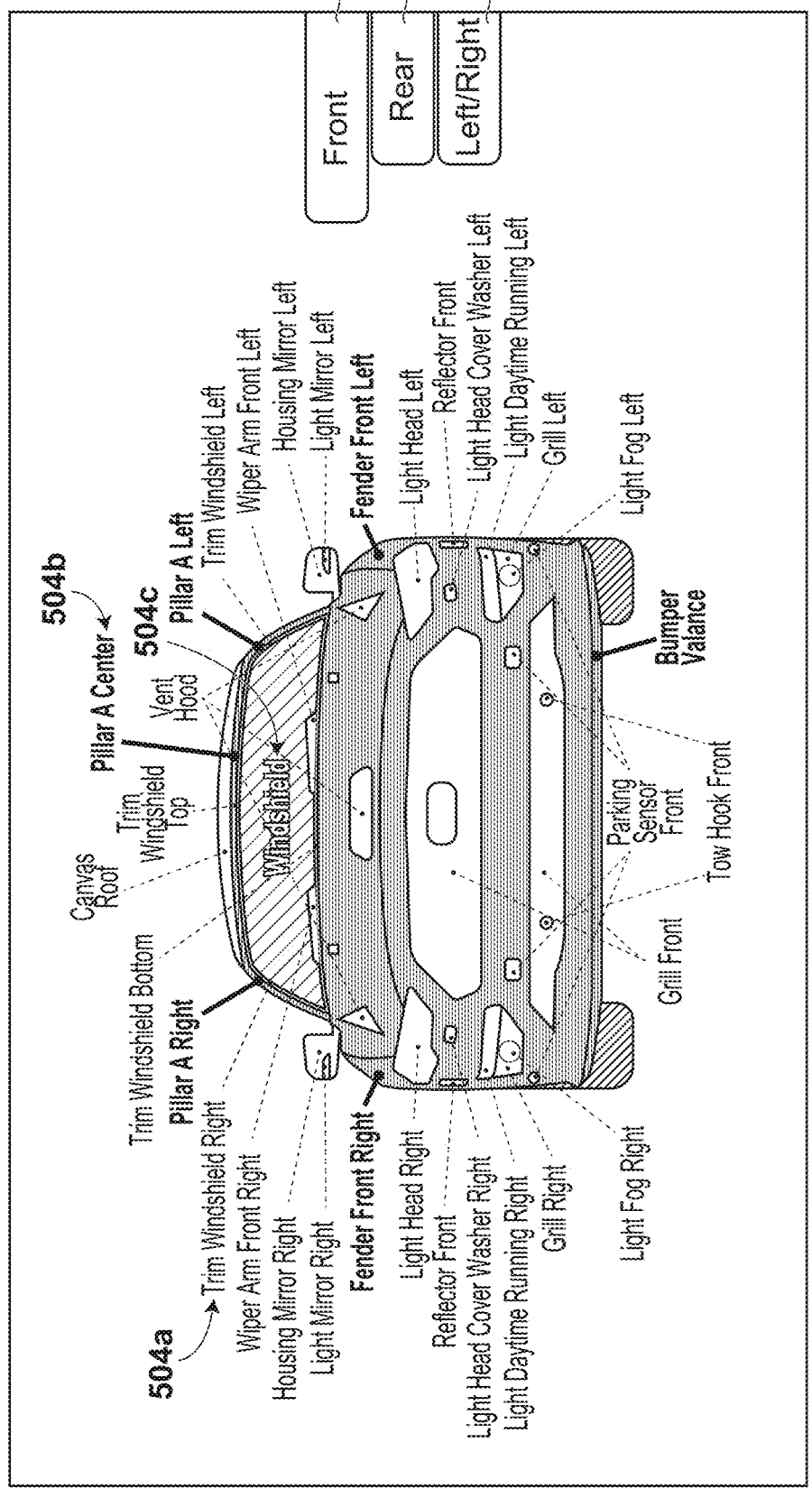
FIG. 5 illustrates an example interface of a front view of an object cage with example parts shown, according to some embodiments.

FIG. 5 illustrates an example interface of a front view of an object cage with example parts shown, according to some embodiments.

In some embodiments an example interface of a front view 500 of an object such as a vehicle with example parts shown may include the front cage 502, with part labels 504 (including part labels 504*a*, 504*b*, and 504*c*). The interface may also include view options 506 (including 506*a*, 506*b*, and 506*c*) to toggle between other views of the object included in the object's complete cage.

Front cage 502 can be colour coded to visually distinguish different parts or regions of the object. For example, the image shows four different regions corresponding to the body, the features, the windows, and the tires. Such colour coordination can assist a user in visually distinguishing the parts or regions of the vehicle.

The part labels 504 can indicate which part they are pointing to. In some embodiments, the part labels 504 can also be colour coded to match or correspond to the colour coding of the front cage 502. In some embodiments part labels 504 may be colour coded differently than the colour code used for front cage 502. Part labels 504a correspond to those of the features and may be used to indicate parts such as trim windshield right, light head right, light fog right, grill left, badge front, housing mirror left, vent hood, etc. Part labels 504b correspond to those of the body and may be used to indicate pillar A center, fender front right, bumper valance, etc. Part labels 504c correspond to those of the windows and may indicate windshield, etc. In some embodiments, part labels 504 may not be differentiated based on regions of the object.

Part labels 504 may further be customizable, for example, when generating a new object cage, a user or a system may start with a default cage (labelled or otherwise) and add, remove, or rename part labels 504 as is appropriate.

View options 506 can be used to toggle between different views of an object. In the Figure, view option 506a indicates the front view and is presently selected (hence front cage 502 being displayed). Selecting view option 506b, which indicates rear, may update the interface to display a rear cage (e.g., a rear cage 702). Selecting view option 506c, which indicates left/right, may update the interface to display a side cage (e.g., a side cage 602).

Figure 6:
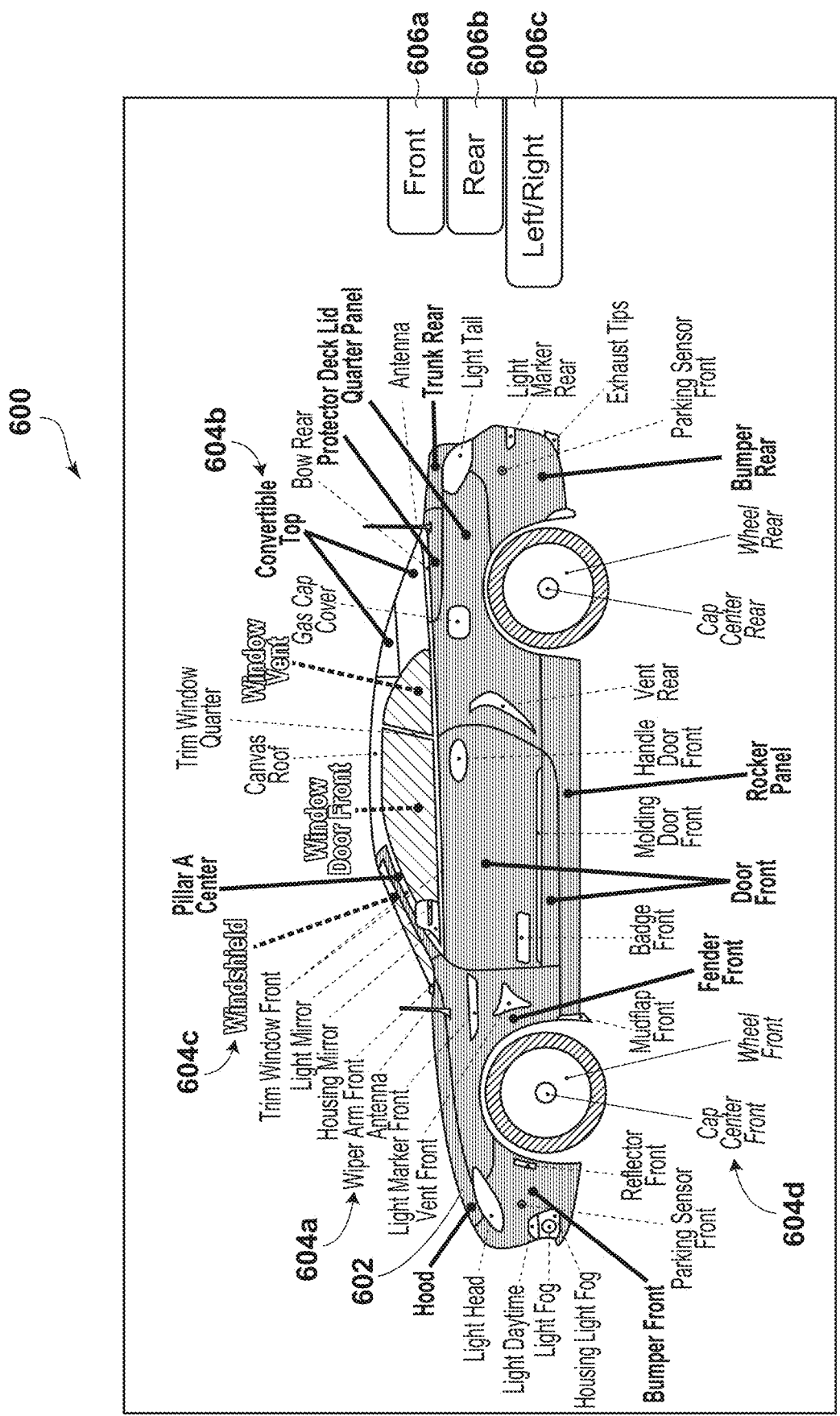
FIG. 6 illustrates an example interface of a side view of an object cage with example parts shown, according to some embodiments.

FIG. 6 illustrates an example interface of a side view of an object cage with example parts shown, according to some embodiments.

In some embodiments an example interface of a side view 600 of an object such as a vehicle with example parts shown may include the side cage 602, with part labels 604 (including part labels 604a, 604b, 604c, and 604d). The interface may also include options 606 (including 606a, 606b, and 606c) to toggle between other views of the object included in the object's complete cage.

Side cage 602 can be colour coded to visually distinguish different parts or regions of the object. For example, the image shows the same regions as described for FIG. 5. Such colour coordination can assist a user in visually distinguishing the parts or regions of the vehicle.

The part labels 604 can indicate which part they are pointing to. In some embodiments, the part labels 604 can also be colour coded to match or correspond to the colour coding of the side cage 602. In some embodiments part labels 604 may be colour coded differently than the colour code used for the side cage 602. Part labels 604a correspond to those of the features and may be used to indicate parts such as antenna, light head, mudflap front, parking sensor, bow rear, canvas roof, etc. Part labels 604b correspond to those of the body and may be used to indicate convertible top, hood, fender front, bumper rear, etc. Part labels 604c correspond to those of the windows and may indicate windshield, window door front, window vent, etc. Part labels 604d correspond to those of the tires and may indicate cap center front, wheel front, cap center rear, wheel rear, etc. In some embodiments, part labels 604 may not be differentiated based on regions of the object.

Part labels 604 may further be customizable, for example, when generating a new object cage, a user or a system may start with a default cage (labelled or otherwise) and add, remove, or rename part labels 604 as is appropriate.

View options 606 can be used to toggle between different views of an object. In the Figure, view option 606c indicates the left/right view and is presently selected (hence side cage 602 being displayed). Selecting view option 606a, which indicates front, may update the interface to display a front cage (e.g., a front cage 502). Selecting view option 506b, which indicates rear, may update the interface to display a rear cage (e.g., a rear cage 702).

Figure 7:
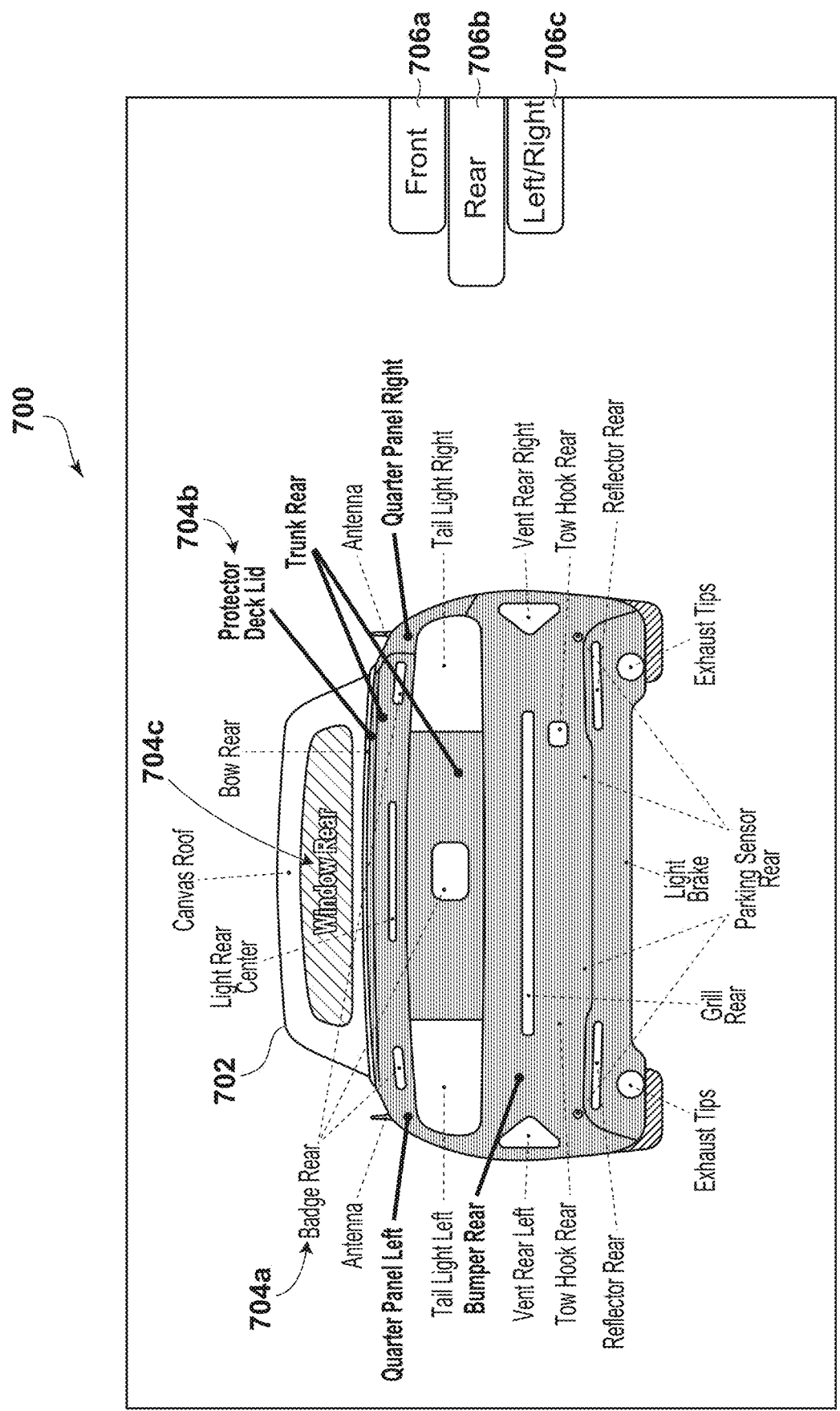
FIG. 7 illustrates an example interface of a rear view of an object cage with example parts shown, according to some embodiments.

FIG. 7 illustrates an example interface of a rear view of an object cage with example parts shown, according to some embodiments.

In some embodiments an example interface of a rear view 700 of an object such as a vehicle with example parts shown may include the rear cage 702, with part labels 704 (including part labels 704a, 704b, and 704c). The interface may also include options 706 (including 706a, 706b, and 706c) to toggle between any other views of the object included in the object's complete cage.

Rear cage 702 can be colour coded to visually distinguish different parts or regions of the object. example, the image shows the same regions as described for FIG. 5. Such colour coordination can assist a user in visually distinguishing the parts or regions of the vehicle.

The part labels 704 can indicate which part they are pointing to. In some embodiments, the part labels 704 can also be colour coded to match or correspond to the colour coding of the rear cage 702. In some embodiments part labels 704 may be colour coded differently than the colour code used for the side cage 702. Part labels 704a correspond to those of the features and may be used to indicate parts such as badge rear, reflector rear, exhaust tips, light rail rights, etc. Part labels 704b correspond to those of the body and may be used to indicate protector deck lid, quarter panel left, trunk rear, etc. Part labels 704c correspond to those of the windows and may indicate window rear, etc. In some embodiments, part labels 704 may not be differentiated based on regions of the object.

Part labels 704 may further be customizable, for example, when generating a new object cage, a user or a system may start with a default cage (labelled or otherwise) and add, remove, or rename part labels 704 as is appropriate.

View options 706 can be used to toggle between different views of an object. In the Figure, view option 706b indicates the rear view and is presently selected (hence rear cage 702 being displayed). Selecting view option 706a, which indicates front, may update the interface to display a front cage (e.g., a front cage 502). Selecting view option 706c, which indicates left/right, may update the interface to display a side cage (e.g., a side cage 602).

Collectively, front cage 502, side cage 602, and rear cage 702 may make up a complete Scalable Vector Cage of, for example, a vehicle (i.e., each cage 502, 602, 702 is a cage for a view of the object, collectively making up the full cage for that object). Other views are conceived of as may be appropriate depending on the object type. The interface views 500, 600, and 700 provide a convenient means for a 3D object to be illustrated on a 2D display (such as that of a computer). In some embodiments, the interface may be configured to present other representations. In some embodiments, the interface may be configured to illustrate an interactive 3D model of the object which a user may be able to manipulate using inputs to see other regions of the screen (e.g., swipe left to rotate the cage left).

Example Implementation of a Vehicular Scalable Vector Cage Repository

In some embodiments, the Scalable Vector Cages for various object types may be stored within a SVC Repository (e.g., the Scalable Vector Cages (SVC) Repository in data storage 108 of system 100). In these implementations, the repository may be accessible using a user interface to review and/or update or generate new cages. A server implementation may be beneficial where there are many object types each with their own cages that will require compilation of data from many parties (e.g., many different photographers, cage generators, outliners, and labellers).

Figure 8:
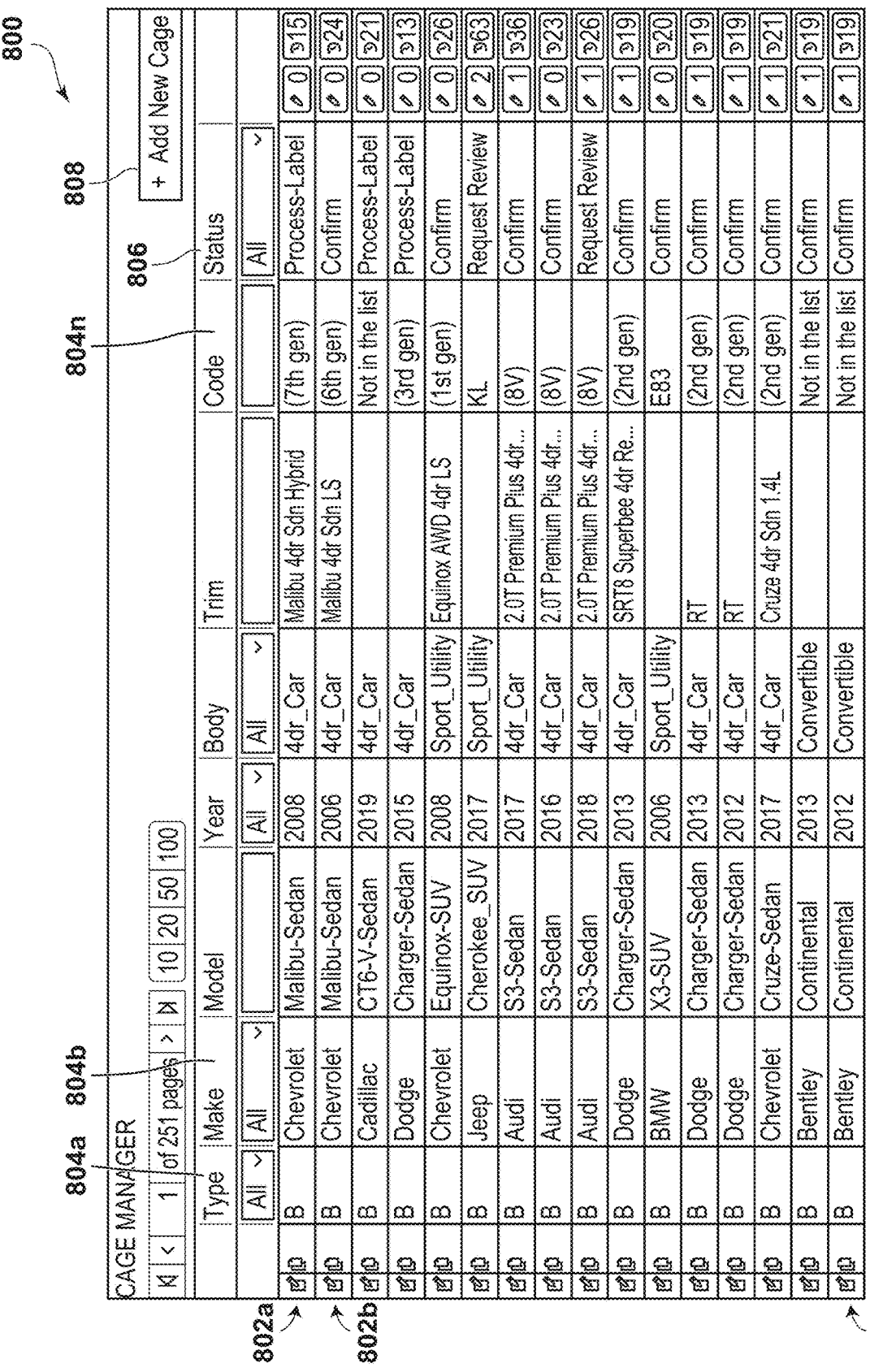
FIG. 8 illustrates an example interface for a repository of types of Scalable Vector Cages, according to some embodiments.

FIG. 8 illustrates an example interface for a repository of types of Scalable Vector Cages, according to some embodiments.

The interface 800 displays a list of entries 802 (including entries 802a, 802b through to 802n). Each entry 802 may further display object type information 804 (including object type information 804a, 804b through to 804n) to differentiate the object type from other object types. The object type information may include, for example, type, make, model, year, body, trim, and code. It may also include other information necessary or helpful to differentiate the cages from one another (e.g., location of manufacture or intended market). In some embodiments, some or all of the object type information 804 may be used to generate a default cage (e.g., a body of "4dr_Car" may be used to generate a cage of a generic four door car type vehicle).

Each entry 802 may further include a status indicator 806. This status indicator 806 may be used to communicate the cage generation stage. For example, a cage which has been fully photographed, generated, outlined, and all parts identified may be listed as complete. Confirmation of the accuracy of an entry may be requested. The step in the process of cage generation may further be listed. The status 806 may be used so users or system components know when to access, process, or modify an entry 802.

The interface 800 may further include an add cage button 808 used to generate a new entry 804 for a new cage. These new entries 804 may be placeholders or they may be partially generated from any input object type information 804.

FIG. 9 illustrates an example interface for a Scalable Vector Cage of a type, according to some embodiments.

The interface 900 displays further information for a particular cage. The interface 900 illustrates object type information 902 along the top which may or may not correspond to the object type information 804 discussed previously. Here a user may be able to modify or update the object type information 902. The user may also update the status of the cage or otherwise delete it.

The interface 900 shows a Scalable Vector Cage for the object comprising four 2D views of the object each view having a cage for that view. Here, the views include a left view, a front view, a right view, and a rear view. Information about the views can be reviewed or uploaded by interacting with the cage detail table 904. The cage detail table 904 includes entries for each of the views (left, front, right, rear) and information about whether a photo of that view has been uploaded (and which user did so), whether a cage has been uploaded/generated (and which user did so), whether an outline has been uploaded/generated (and which user did so), and whether it has been labelled (and which user did so). In some embodiments, a user or a system (such as a one implemented in an industrial manufacturing process) may be used to capture images of the object. These images may be saved within the cage entry in the repository. In some embodiments, a user or an algorithm (such as a machine learning algorithm) may generate a Scalable Vector Cage of the object. These cages may be saved within the cage entry in the repository. In some embodiments, a user or an algorithm (such as a machine learning algorithm) may outline the parts of the object within the cage. These outlines may be saved within the cage entry in the repository. In some embodiments, a user or an algorithm (such as a machine learning algorithm) may label the parts of the object. These labels may be saved within the cage entry in the repository.

Figure 10:
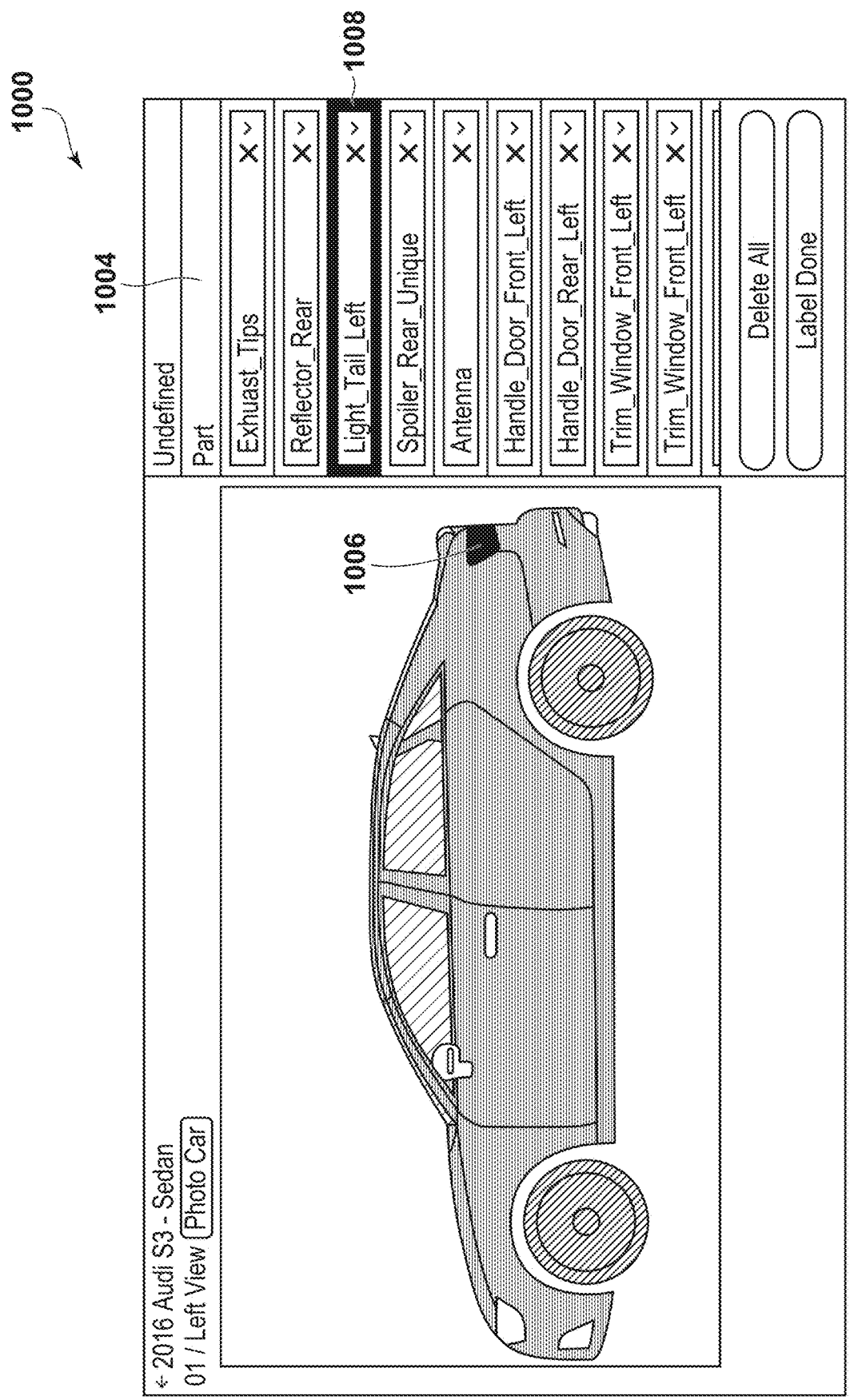
FIG. 10 illustrates an example interface of a view making up a Scalable Vector Cage with a part selected, according to some embodiments.

FIG. 10 illustrates an example interface of a view making up a Scalable Vector Cage with a part selected, according to some embodiments.

In some embodiments, the user may be able to access a view of a cage (e.g., a side cage 1002 of the object's complete cage) to see how the cage has been labelled. The interface 1000 shows an example side cage 1002 which has its parts outlined and labelled. The part window 1004 shows a list of all the parts presently labelled in the cage. In particular, the part 1006 has been selected and the entry 1008 corresponding to the part 1006 has been highlighted. In this example, the part 1006 has been labelled as "LIGHT_TAIL_LEFT". A user or the system may be able to, for example, modify the outline of this part by manipulating the outlines around the part 1006 or change the labelling of the part 1006 by changing the entry 1008 in the part window 1004.

Figure 11:
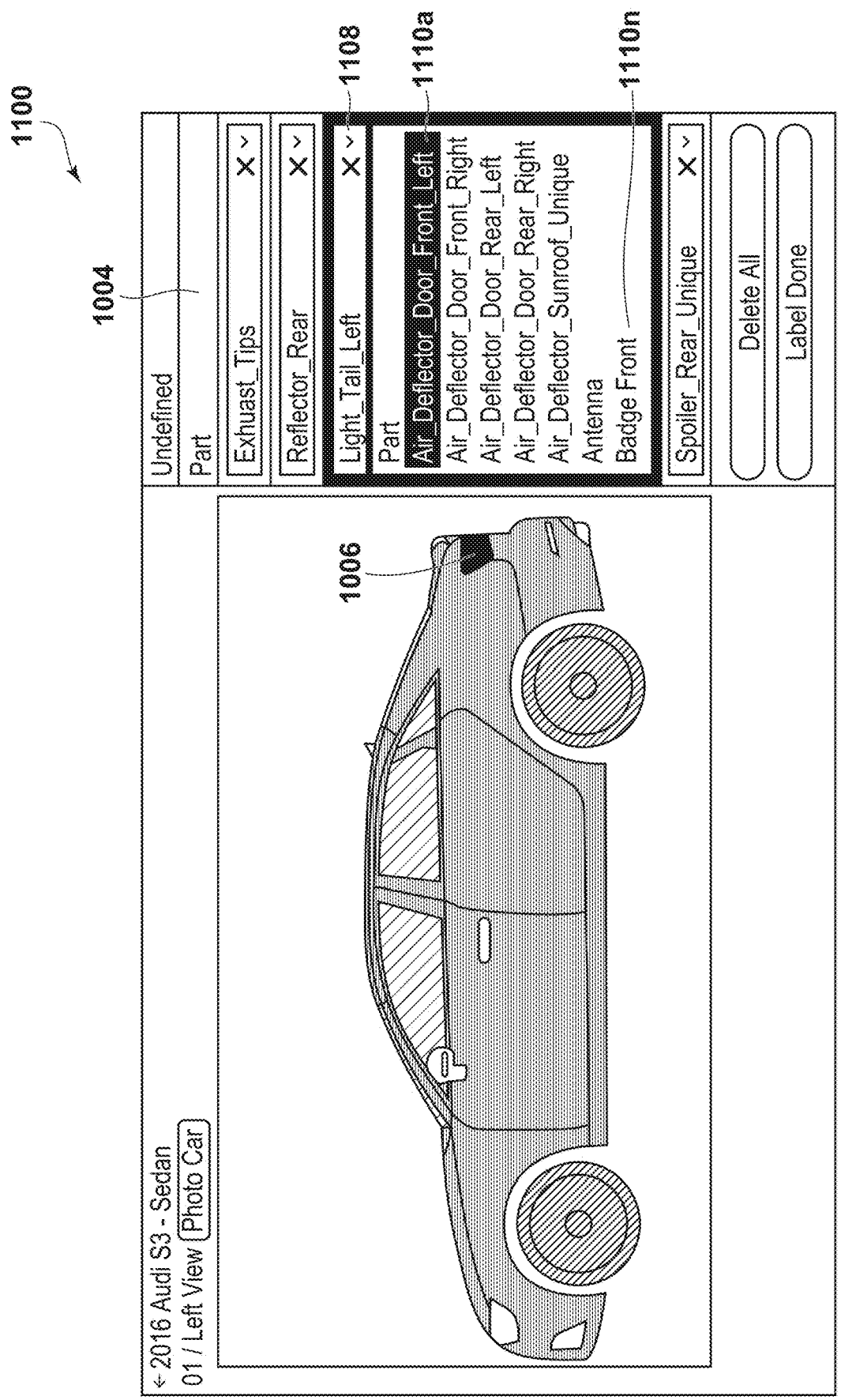
FIG. 11 illustrates an example interface of a view making up a Scalable Vector Cage with a part selected and modification options shown, according to some embodiments.

FIG. 11 illustrates an example interface of a view making up a Scalable Vector Cage with a part selected and modification options shown, according to some embodiments.

In some embodiments, the user may be able to modify part labels. The interface 1100 shows an example side cage 1102. The part window 1104 shows a list of all the parts presently labelled in the cage. In particular, the part 1006 has been selected and the entry 1008 corresponding to the part 1006 has been highlighted. In this example, a dropdown menu showing other parts 1110a through to 1110n has appeared. The user may be able to update the label for entry 1008 by selecting one of the other part labels 1110a-1110n. In some embodiments, the user may be able to add a new part label. In some embodiments, the system may be configured to select the part label automatically.

Computing Device Implementation Details

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout this discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide better memory usage, improved processing, improved bandwidth usage, efficient image processing, accurate defect identification, enhanced cost estimates, etc.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein can be implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 12:
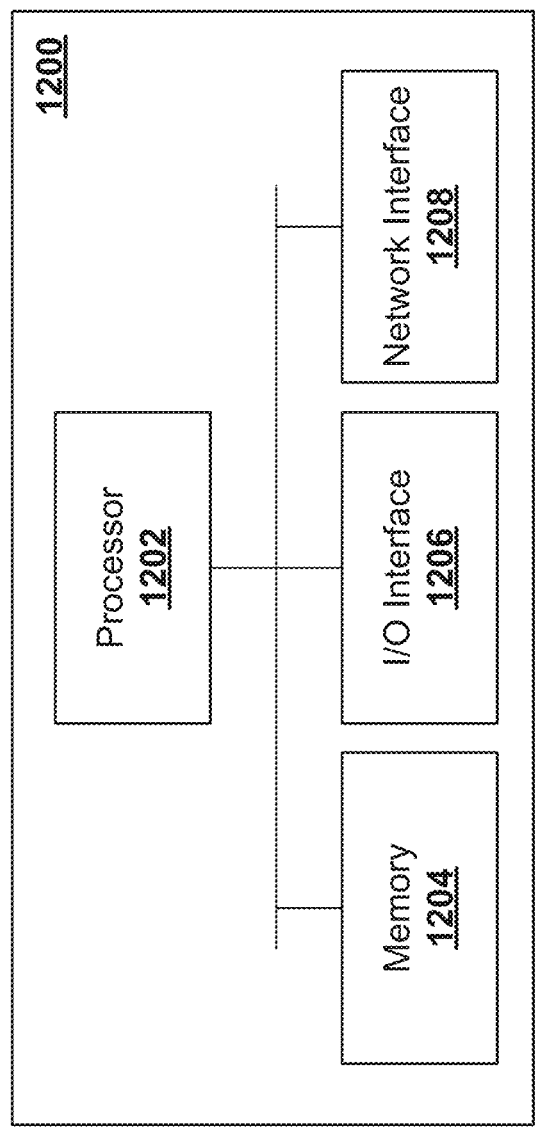
FIG. 12 illustrates a schematic diagram of computing device, according to some embodiments.

FIG. 12 illustrates a schematic diagram of computing device 1200, according to some embodiments.

For simplicity only one computing device 1200 is shown but system may include more computing devices 1200 operable by users to access remote network resources and exchange data. The computing devices 1200 may be the same or different types of devices. As depicted, computing device 1200 includes at least one processor 1202, memory 1204, at least one I/O interface 1206, and at least one network interface 1208. The computing device components may be connected in various ways including directly coupled, indirectly coupled via a network, and distributed over a wide geographic area and connected via a network (which may be referred to as "cloud computing"). For example, and without limitation, the computing device 1200 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein Each processor 1202 may be, for example, any type of general-purpose microprocessor or microcontroller, a digital signal processing (DSP) processor, an integrated circuit, a field programmable gate array (FPGA), a reconfigurable processor, a programmable read-only memory (PROM), a graphics processing unit (GPU), or any combination thereof.

Memory 1204 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 1200 is operable to register and authenticate users (using a login, unique identifier, and password for example) prior to providing access to applications, a local network, network resources, other networks and network security devices. Computing devices 1200 may serve one user or multiple users.

Implementation with Other Related Solutions

The systems and methods described herein may be used in conjunction with the systems and methods described in PCT Application No PCT/CA2019/051463, filed 16 Oct. 2019, entitled "AUTOMATED ARTIFICIAL INTELLIGENCE VEHICLE APPRAISALS", published as PCT Pub No WO2020/077449, the contents of which are herein incorporated by reference.

In some embodiments, the systems and method provided herein may be used with a system for vehicle appraisals using image processing. The system has a server having non-transitory computer readable storage medium with executable instructions for causing one or more processors to configure: an interface application with a vehicle capture module to capture images of a vehicle and metadata for the captured images, the interface application displaying an interactive guide to assist in capturing the images, the interactive guide generated using a cage for a vehicle type, the cage defining locations or components of the vehicle, a vehicle identification number being metadata for the captured images, the vehicle identification number indicating the vehicle type; a recognition engine to process the captured images and metadata to detect defects of the vehicle and compute vehicle metrics, the processing based on different tasks dispatched to agent interfaces to receive input data for detecting the defects of the vehicle and computing the vehicle metrics; a cost estimate tool to process the vehicle metrics to compute cost data for repair of the defects of the vehicle; a valuation tool to compute a market value estimate for the vehicle using the vehicle metrics and the cost data; and wherein the interface application has visual elements corresponding to the interactive guide, the market value estimate, the cost data, and at least a portion of the vehicle metrics.

In some embodiments, the systems and method provided herein may be used with a system for vehicle appraisals using image processing. The system has a server having non-transitory computer readable storage medium with executable instructions for causing one or more processors to configure: an interface application with a vehicle capture module to capture images of a vehicle and metadata for the captured images, the interface application displaying an interactive guide to assist in capturing the images, the interactive guide having overlays that update to assist in capturing different images of views of the vehicle that correspond to side views of the vehicle, a front view of the vehicle, and a rear view of the vehicle, the interactive guide generated using a cage for a vehicle type, the cage defining locations or components of the vehicle, a vehicle identification number being metadata for the captured images, the vehicle identification number indicating the vehicle type, wherein the cage has different cage views comprising the side views of the vehicle, the front view of the vehicle, and the rear view of the vehicle, wherein the overlays comprise the different cage views to assist in capturing the different images with corresponding views of the vehicle. The system also has a plurality of agent interfaces, each agent interface having a task dashboard to display a portion of the captured images to receive input data, wherein the plurality of agent interfaces display the different cage views as overlays for the captured images with corresponding views. The server further configuring: a recognition engine to process the captured images and metadata to detect defects of the vehicle and compute vehicle metrics, the processing based on a plurality of tasks dispatched to the plurality of agent interfaces to receive the input data for detecting the defects of the vehicle and computing the vehicle metrics, each task dispatched to a corresponding agent interface; each task associated with the portion of the captured images to display within the corresponding agent interface, wherein the system defines tasks for each view of the vehicle; a cost estimate tool to process the vehicle metrics to compute cost data for repair of the defects of the vehicle; a valuation tool to compute a market value estimate for the vehicle using the vehicle metrics and the cost data. The interface application has visual elements corresponding to the interactive guide, the market value estimate, the cost data, and at least a portion of the vehicle metrics.

General Implementation Details

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The foregoing has been described with particular attention to the application to segmenting parts of a vehicle for exemplary purposes only. The systems and methods described herein, even when explicitly referencing a vehicle, are broadly applicable to many object categories. Other applicable object categories include other merchandise, industrial equipment, aircraft parts and components, construction equipment and machinery, medical equipment and devices, electronic devices and components, furniture and fixtures, agricultural machinery and equipment, marine vessels and components, manufacturing machinery and equipment, power generation and distribution equipment, scientific instruments, equipment, and more generally, any item with parts. These processes may also be useful in any application where something needs to be visually inspected, particularly complex objects comprising parts.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

What is claimed is:

1. A system for classifying segments of a vehicle, the system comprising: a server having non-transitory computer readable storage medium with executable instructions for causing one or more processors to:
   identify a cage for image alignment from captured images by at least one of comparing a plurality of cages to the captured images, and extracting a serial or identification number associated with the cage, wherein the captured images are of the vehicle or at least a portion thereof, wherein the cage is a multi-dimensional model of the vehicle that comprises information related to the positioning of segments relative to the vehicle, wherein the cage comprises a graphic script in a domain specific language;
   align the captured images onto the cage to identify segments of the vehicle in the captured images, wherein the graphic script defines segments of the vehicle and maps the segments of the vehicle onto the captured images, wherein aligning the captured images onto the cage comprises: generating a semantic mask from a pixel-wise classification of the captured images; and
   optimizing a homography matrix between the cage and the semantic mask, wherein the homography matrix defines a composition of rotations, translations, scaling, and/or distortion correction to align the cage with the semantic mask, wherein the cage and the semantic mask are compared as two binary arrays of a same shape;

classifying the segments based on the cage and the optimized homography matrix for detecting one or more physical conditions of the segments of the vehicle in the captured images.

2. The system of claim 1, wherein the server is further configured to cause one or more processors to configure an interface application with an object capture module to capture the images of the vehicle, wherein the object capture module captures metadata for the captured images and the server is further configured to use the metadata to process the captured images.

3. The system of claim 1, wherein the cage is for an object type, wherein the server retrieves the object type based on the serial or identification number of the object, wherein the server is further configured to identify the object type based on the captured images by extracting a serial or identification number of the vehicle from an image.

4. The system of claim 1, wherein the cage comprises one or more different cage views comprising the side views of the vehicle, the front view of the vehicle, and the rear view of the vehicle.

5. The system of claim 1, wherein the cage can be rendered with segment outlines of varying widths.

6. The system of claim 1, wherein the cage comprises a generalized representation of a vehicle type.

7. The system of claim 1, wherein the server is further configured to generate a multi-dimensional representation of the vehicle from the graphic script of the cage and the captured images.

8. The system of claim 1, wherein the server is further configured to compute cost data for repair of the one or more physical conditions.

9. The system of claim 1, wherein
semantic segmentation models output the pixel-wise classification of the captured images, wherein the semantic segmentation models are parametric machine learning models trained to produce semantic masks from a dataset of pixel-level annotations of images.

10. The system of claim 1 wherein the server is further configured for training at least one machine learning model, the machine learning model identifying the cages, aligning the captured images with the cages, and classifying the segments.

11. A method for classifying segments of an object, the method comprising:

identifying a cage for image alignment from captured images by at least one of comparing a plurality of cages to the captured images, and extracting a serial or identification number associated with the cage, the cage defining segments of the vehicle that comprises information related to the positioning of segments relative to the vehicle, wherein the cage comprises a graphic script in a domain specific language;

aligning the captured images onto the cage to identify segments of the vehicle in the captured images, wherein the graphic script defines segments of the vehicle and maps the segments of the vehicle onto the captured images, wherein aligning the captured images onto the cage comprises:

generating a semantic mask from a pixel-wise classification of the captured images; and optimizing a homography matrix between the cage and the semantic mask, wherein the homography matrix defines a composition of rotations, translations, scaling, and/or distortion correction to align the cage with the semantic mask, wherein the cage and the semantic mask are compared as two binary arrays of a same shape; and classifying the segments based on the cage and the optimized homography matrix for detecting one or more physical conditions of the segments of the vehicle in the captured images.

12. The method of claim 11, the method further comprising:

capturing metadata for the captured images, wherein the metadata indicates a location on the captured image and a corresponding descriptor label; and at least one of:
align the captured images by aligning the location on the captured image with the segment corresponding to the corresponding descriptor label; and
detect the one or more physical conditions, wherein the corresponding descriptor label indicates the one or more physical conditions and the location is a location of the one or more physical conditions.

13. The method of claim 11, wherein the cage is for an object type, the method comprising retrieving the object type based on the serial or identification number of the object.

14. The method of claim 11, wherein the cage comprises one or more different cage views.

15. The method of claim 11, wherein the cage can be rendered with segment outlines of varying widths.

16. The method of claim 11, wherein the cage comprises a generalized representation of a vehicle type.

17. The method of claim 16, the method further comprising identifying the vehicle type based on the captured images.

18. The method of claim 11, the method further comprising generating a multi-dimensional representation of the vehicle using the graphic script of the cage and the captured images.

19. The method of claim 11, wherein
semantic segmentation models output the pixel-wise classification of the captured images, wherein the semantic segmentation models are parametric machine learning models trained to produce semantic masks from a dataset of pixel-level annotations of images.

* * * * *